(12) United States Patent
Tolley et al.

(10) Patent No.: US 11,674,545 B2
(45) Date of Patent: Jun. 13, 2023

(54) SUCTION DISCS FOR ADHESION TO ROUGH, DELICATE, AND WET SURFACES

(71) Applicant: THE REGENTS OF THE UNIVERSITY OF CALIFORNIA, Oakland, CA (US)

(72) Inventors: Michael T. Tolley, La Jolla, CA (US); Jessica Sandoval, San Diego, CA (US); Dimitri Deheyn, Cardiff-by-the-Sea, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/489,578

(22) Filed: Sep. 29, 2021

(65) Prior Publication Data

US 2022/0145928 A1 May 12, 2022

Related U.S. Application Data

(60) Provisional application No. 63/084,974, filed on Sep. 29, 2020.

(51) Int. Cl.
*F16B 47/00* (2006.01)
*B25J 15/06* (2006.01)

(52) U.S. Cl.
CPC ........... *F16B 47/00* (2013.01); *B25J 15/0683* (2013.01)

(58) Field of Classification Search
CPC .... F16B 47/00; B25J 15/0683; B25J 15/0616; B25J 15/12

USPC ...... 248/467, 683, 537, 205.5, 205.8, 206.2, 248/206.3, 309.3, 362, 363
See application file for complete search history.

(56) References Cited

U.S. PATENT DOCUMENTS

| | | | | |
|---|---|---|---|---|
| 2,908,467 A | * | 10/1959 | Aberer | A47J 45/02 29/421.1 |
| 8,496,222 B2 | * | 7/2013 | Li | F16B 47/006 248/205.5 |
| 8,783,634 B2 | | 7/2014 | Summers et al. | |
| 2005/0168001 A1 | * | 8/2005 | Perlman | B25J 15/0616 294/189 |
| 2007/0023594 A1 | * | 2/2007 | Choi | F16B 47/00 248/205.5 |

(Continued)

OTHER PUBLICATIONS

Ditsche, P., et al., Learning from Northern clingfish (*Gobiesox maeandricus*): bioinspired suction cups attach to rough surfaces, Philosophical Transactions B, Feb. 4, 2019, pp. 1-8.

(Continued)

*Primary Examiner* — Muhammad Ijaz
(74) *Attorney, Agent, or Firm* — Eleanor Musick; Torrey Pines Law Group PC

(57) ABSTRACT

A bioinspired suction device includes a radially symmetrical suction chamber formed from a first elastomer and having a skirt portion with a skirt diameter and a disc margin formed from a flexible flattened ring adhered to a lower surface of the skirt portion. The disc margin is formed from a second elastomer and has a disc diameter that extends beyond the skirt diameter. The second elastomer is a compliant material having a lower hardness and lower tensile strength than the first elastomer. Radial pads may extend from the disc margin, where each pad has elastomeric texture features formed on a pad contact surface.

22 Claims, 17 Drawing Sheets

(56) References Cited

U.S. PATENT DOCUMENTS

| | | | | |
|---|---|---|---|---|
| 2007/0241246 A1* | 10/2007 | Ristau | ............... | F16B 47/00 |
| | | | | 248/206.2 |
| 2008/0048084 A1* | 2/2008 | Takahashi | ............... | F16B 47/00 |
| | | | | 248/363 |
| 2012/0097820 A1* | 4/2012 | Hajianpour | ............ | F16B 47/00 |
| | | | | 248/363 |
| 2015/0330438 A1* | 11/2015 | Shi | ............... | F16B 47/006 |
| | | | | 248/205.8 |
| 2021/0231163 A1* | 7/2021 | Ditsche | ............... | F16M 13/022 |

OTHER PUBLICATIONS

Sandoval, J.A., Reversible adhesion to rough surfaces both in and out of water, inspired by the clingfish suction disc, Bioinspiration & Biomimetrics, 2019, pp. 1-19.

Wang, Y., et al., A biorobotic adhesive disc for underwater hitchhiking inspired by the remora suckerfish, Science Robotics Biomimetics, Sep. 20, 2017, pp. 1-9, vol.

\* cited by examiner

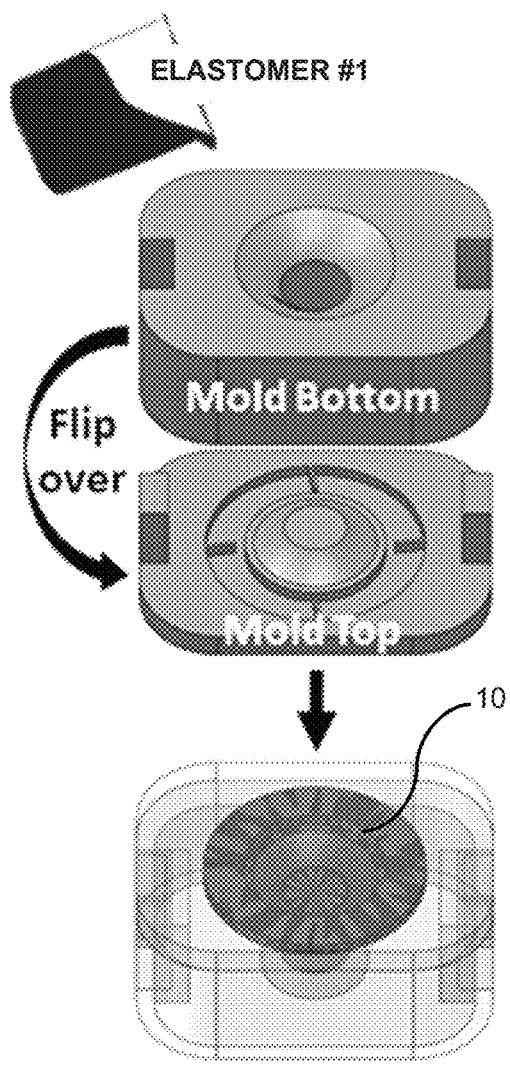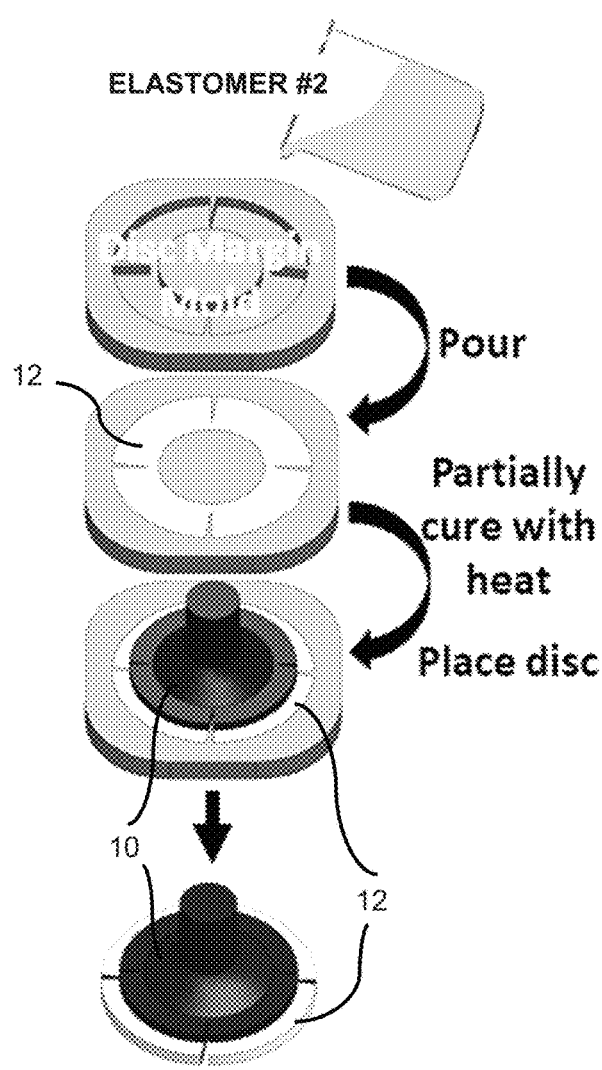
FIG. 1G
FIG. 1H

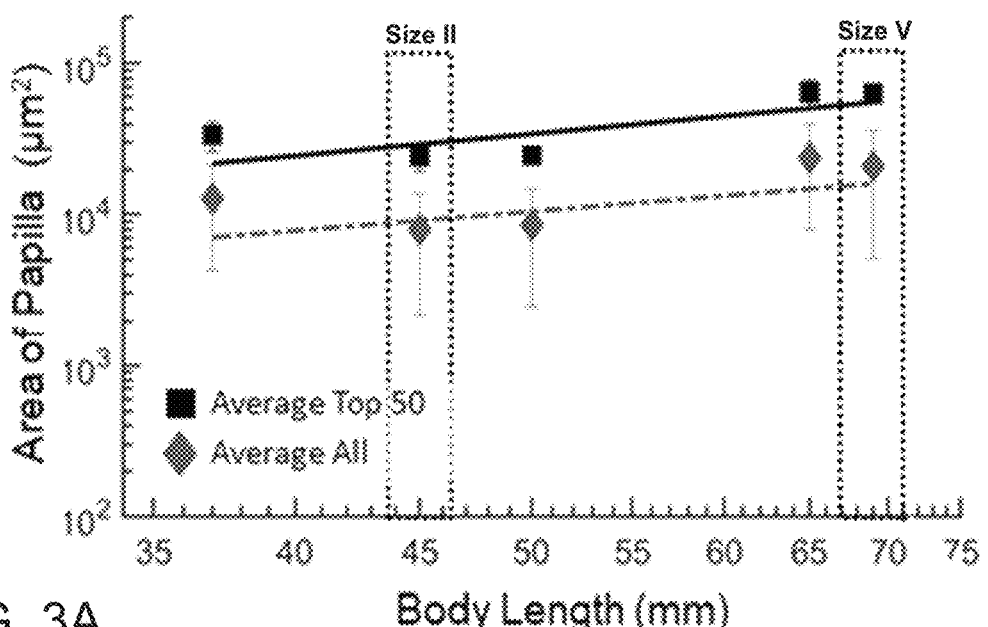
FIG. 3A
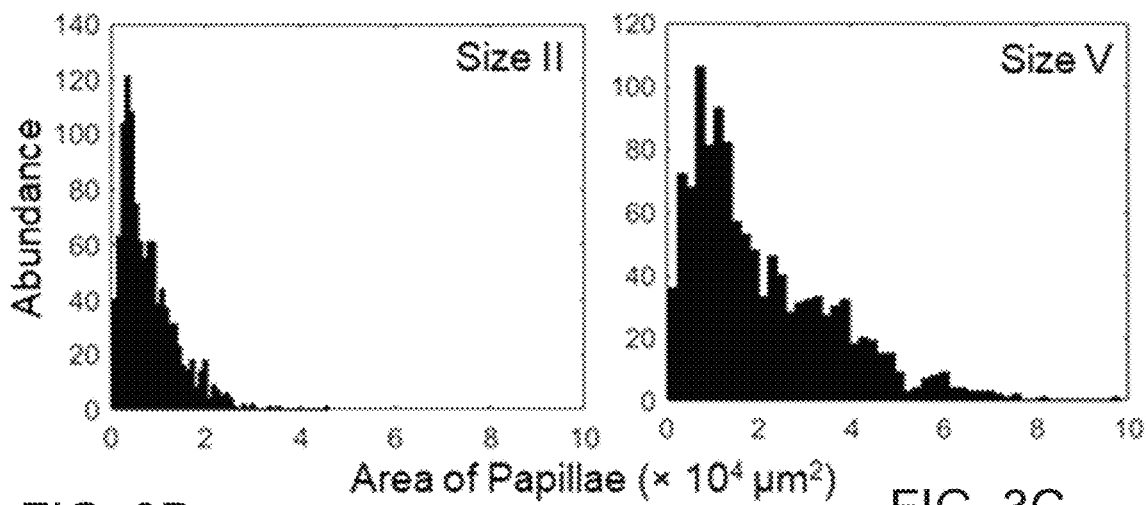
FIG. 3B
FIG. 3C
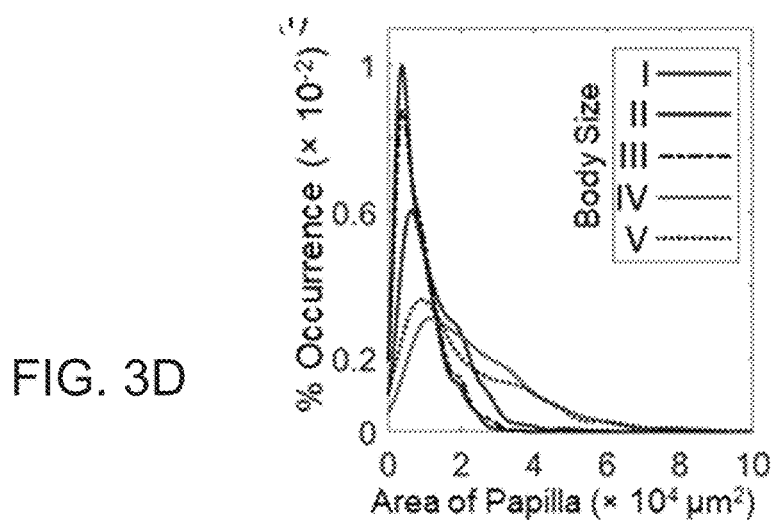
FIG. 3D

SUCTION DISCS FOR ADHESION TO ROUGH, DELICATE, AND WET SURFACES

RELATED APPLICATIONS

This application claims the benefit of the priority of U.S. Provisional Application No. 63/084,974, filed Sep. 29, 2020, which is incorporated herein by reference in its entirety.

GOVERNMENT RIGHTS

This invention was made with government support under Grant No. N00014172062 awarded by the Office of Naval Research. The government has certain rights in the invention.

FIELD OF THE INVENTION

The present invention relates to a bioinspired, elastomeric suction disc supported by surface textures capable of attaching to diverse surfaces in both wet and dry environments and withstanding high axial and shear loads.

BACKGROUND

Adhesion involves highly complex and hierarchical structures in nature, and by understanding the biological intricacies of such adhesive structures, one can improve engineered adhesives. The role of reversible adhesion in both the natural world and in engineering is to temporarily bind to a surface, providing the opportunity to detach and re-attach as needed. In nature, animals use attachment to enhance their fitness, thereby taking advantage of beneficial opportunities, such as decreased instances of competition and predation or an increased abundance of resources, that would otherwise not be attained. In robotics, reversible adhesion enables improved manipulation and locomotion by managing contact at the interface between the robot and its environment.

Adhesion can be broadly categorized into either dry (i.e., via van der Waals interactions) or wet. Narrowing our focus to wet adhesion, this form of attachment takes advantage of viscous fluids, such as mucosal secretions (whether from terrestrial or aquatic organisms), found between an adhesive pad and a surface. Wet adhesion encompasses both capillarity, which is dependent on the surface tension of the fluid, and hydrodynamic forces. Hydrodynamic adhesion, also called Stefan adhesion, is due to viscous forces and is dependent on the rate at which an adhesive structure is pulled from a surface.

The performance of both biological and engineered adhesives is dependent on surface properties (i.e., roughness and lubrication) and environmental conditions (i.e., wetness and disruptive forces). An increase in surface roughness has been demonstrated to greatly reduce attachment performance in synthetic adhesives. For instance, devices such as suction cups or microstructured adhesives function optimally on flat, smooth surfaces. Modifications to the geometries of the microstructured adhesives, such as the addition of hierarchical structures, has been shown to improve adhesive performance to rough surfaces via enhanced surface conformation.

Attachment performance varies based on environmental conditions. Wetness and humidity have been shown to compromise adhesive performance due to the presence of water between the contacting surfaces, excluding synthetic dry adhesives from functioning in a wet domain. However, recent developments to synthetic dry adhesives, including modifications to the material composition and structure, such as the addition of cupped microstructures, have conferred the ability to adhere to wet surfaces. In addition to wetness, the dislodgement forces per environment type also shapes the adhesive devices that can be applied. In a terrestrial environment, gravity—of a predictable direction and magnitude—plays a substantial role in dislodgment. However, in a wet environment, fluid flow—often of unpredictable direction and magnitude—becomes a predominant mode of dislodgement. Adhesive strategies to be employed underwater must be resilient to these more randomized and dynamic disturbances.

Using inspiration from nature, engineers have developed a range of bioinspired adhesives with impressive capabilities. For example, gecko-inspired, microstructured adhesives have expanded robotic capabilities for applications ranging from manipulating objects with irregular surface topologies and large objects in microgravity to climbing vertical walls. Tree-frog inspired surface structures have been developed to enable the delicate manipulation of soft tissue during surgery. Remora-inspired adhesion has yielded hitchhiking and manipulation capabilities for underwater robots. However, the addition of hierarchical mechanisms for adhesion in a wet environment has remained relatively unexplored.

The northern clingfish (*Gobiesox maeandricus*) is promising a candidate for bioinspired adhesion due to its ability to adhere to rough surfaces while supporting large loads, up to 230 times its body weight. The ability of the clingfish to attach to rough surfaces stems from its highly evolved suction disc formed by its modified pelvic and pectoral fins. The suction disc forms a cavity, considered the suction chamber, and is lined by a disc margin (FIG. 1, panel b). The suction chamber maintains sub-ambient pressure while the disc margin acts to secure and seal its perimeter. A prominent feature of the disc margin is an extensive layer of papillae, which are geometric, flattened epithelial protrusions (FIG. 1, panel c). The papillae act to reinforce the disc margin on irregular surfaces, in part by resisting shear and axial dislodgement forces. The papillae come in a diversity of sizes, shapes, and distributions across the suction disc. These impressive abilities and biological designs make the clingfish an ideal candidate for identifying designs to produce high-performance bioinspired adhesives.

SUMMARY

A clingfish-inspired adhesive couples suction, material stiffness, and texturing to achieve a stable grip to rough and irregular surfaces in a wet environment. The suction disc relies on elastomeric materials and soft sealing layers to achieve adhesion to rough surfaces. In some embodiments, this suction disc is coupled with elastomeric textures (i.e., biomimetic hexagons) to achieve stability to shear disruptive forces. The combination of texturing and suction leverages the benefits of suction for axial adhesion, textures for wet friction, and soft elastomers for sealing and delicate surface conformation.

The inventive suction disc is capable of attaching to various surfaces in both wet and dry environments. The suction chamber (cavity of low pressure) has a customized disc margin featuring a thick elastomeric layer and/or microscopic surface structures to attach to rough, wet surfaces while stabilized against shear forces. The suction disc is capable of attaching to previously difficult surfaces (e.g., submerged rough surfaces) or surfaces coated in viscous secretions (e.g., internal organs) and have been applied from underwater robotic manipulators to surgical grippers. The material compositions, suction disc geometries, and surface structure geometries can be tailored to the application type.

The inventive suction disc is most readily compared to a suction cup, as both employ suction as the driving mechanism of reversible adhesion. A suction cup is composed of a stiff plastic and is capable of adhering to hard, smooth, wet, and flat surfaces. In contrast, our suction disc is composed of multiple layers of soft silicone—the backing layer being the stiffest silicone—and is capable of adhering onto rough surfaces, such as a jagged rock or sandpaper. The suction disc adheres onto variable concave and convex body geometries, in addition to flat surfaces. The disc functions in both dry and wet environments, under dynamic or turbulent flow. Thus, the primary difference of our disc to the suction cup is the disc can adhere to a much wider range of substrates under a much greater diversity of environments.

In some embodiments, the suction discs may include surface textures that are optimized function to stabilize the suction disc when subjected to pulling forces parallel to a surface. Many currently existing suction cups are unable to resist shear forces. These surface textures are optimized based on environment type (i.e., elongated hexagons for surfaces with a viscous lubricating layer) that was inspired from our research on the clingfish that uses such suction disc to attach to rocks during tidal surges.

The inventive suction disc is simple in design and fabrication. Manufacture requires a custom mold, which can be fabricated using 3D printing, and casting using elastomers such as silicone.

In one aspect, the inventive suction device includes: a suction chamber having a radially symmetrical shape centered on a central axis, the suction chamber formed from a first elastomer and having a skirt portion with a skirt diameter; and a disc margin comprising a flexible flattened ring adhered to a lower surface of the skirt portion, the disc margin formed from a second elastomer and having a disc diameter that extends beyond the skirt diameter, wherein the second elastomer is a compliant material having a lower hardness and lower tensile strength than the first elastomer. In some embodiments, the disc margin may have a plurality of radial slits formed therein. The disc margin may have a plurality of elastomeric texture features formed in a contact surface thereof, where the elastomeric texture features are configured to correspond to a geometry and distribution of clingfish papillae. In other embodiments, the disc margin has a plurality of elastomeric texture features formed in a contact surface, where the elastomeric texture features have hexagonal cross-sections. The hexagonal cross-sections are preferably elongated with an average aspect ratio centered around 1.3. In some embodiments, the suction chamber may be connected to an active suction source.

The disc margin may further include a plurality of radially-extending pads, where each pad has a plurality of elastomeric texture features formed in a pad contact surface. The elastomeric texture features may be defined by horizontal channels extending across the pad or by intersecting channels extending across the pad. In some embodiments, the elastomeric texture features may be configured to correspond to a geometry and distribution of clingfish papillae. In other embodiments, the elastomeric texture features may have hexagonal cross-sections, which may be elongated and have an average aspect ratio centered around 1.3. Each pad may be associated with a pneumatic actuator configured for flexing the pad. The first elastomer may be a first silicone material having a Shore A hardness of approximately 20.

In another aspect, the inventive suction device includes: a suction chamber having a radially symmetrical shape centered on a central axis, the suction chamber formed from a first elastomer and having a skirt portion with a skirt diameter; a disc margin comprising a flexible flattened ring adhered to a lower surface of the skirt portion, the disc margin formed from a second elastomer and having a disc diameter that extends beyond the skirt diameter, wherein the second elastomer is a compliant material having a lower hardness and lower tensile strength than the first elastomer; and a plurality of radial pads extending from the disc margin, each pad having a plurality of elastomeric texture features formed from the second elastomer on a pad contact surface.

The elastomeric texture features may be defined by horizontal channels extending across the pad or by intersecting channels extending across the pad. In some embodiments, the elastomeric texture features may be configured to correspond to a geometry and distribution of clingfish papillae. In other embodiments, the elastomeric texture features may have hexagonal cross-sections, which may be elongated and have an average aspect ratio centered around 1.3. Each pad may be associated with a pneumatic actuator configured for flexing the pad. The first elastomer may be a first silicone material having a Shore A hardness of approximately 20.

BRIEF DESCRIPTION OF THE DRAWINGS

FIGS. 1G-1I illustrate the fabrication sequences for the suction chamber, disc margin and micropillars, respectively.

FIGS. 3A-3D provide characterizations of the surface area of individual papillae across the suction disc, where FIG. 3A plots the power-law relationship of the surface area of all papillae and the 50 largest papillae to the length of the clingfish body; FIGS. 3B and 3C plot the abundance of papillae with respect to surface area for Size II and Size V, respectively; and FIG. 3D provides kernel probability distributions of surface areas of papillae across all five clingfish body sizes (I-V).

FIG. 5A is a box plot of aspect ratio averaged across all papillae per specimen; FIG. 5B is a box plot of minimum channel width (μm) for all five body sizes.

DETAILED DESCRIPTION OF EMBODIMENTS

The inventive suction disc includes four main components: 1) the suction chamber, 2) disc margin, 3) surface textures, and 4) active control of suction and the surface textures. Only components 1) and 2) are required for achieving attachment to a surface. Components 3) and 4) are used to optimize adhesion under certain conditions.

The suction disc functions by establishing a chamber that is of a lower pressure than the surrounding environment. The suction chamber employs a stiff elastomer (i.e., silicone) to provide sufficient support of the chamber. A displacement of fluid (i.e., air or water) from beneath the suction disc creates a chamber of low pressure.

The disc margin is used to seal the suction chamber onto surfaces. The disc margin is designed to be a thick layer of soft elastomer that is used to seal the disc on rough surfaces. For evaluation and test, Ecoflex™ 00-30 silicone elastomer, part of the Ecoflex series of soft silicone rubbers commercially available from Smooth-On, Inc., Macungie, Pa., U.S., was used. The selected product is a platinum catalyzed silicone that is curable at room temperature to form a finished materials that are soft, strong and "stretchy", capable of stretching many times its original size without tearing and rebounding to its original form without distortion. Silicone rubber materials are commercially available from a number of different suppliers. Selection of an appropriate source and material to obtain the qualities described herein will be within the level of skill in the art.

To conform to irregular surface geometries and surface roughnesses, the disc margin is soft and complaint. The disc margin can be geometrically designed to improve adhesion. For example, the use of slits in the disc margin allows for greater compliance to irregular surface topologies (non-flat surfaces).

Patterning the surface with biomimetic textures is used to stabilize the suction disc to movements that are parallel to the surface. An understanding of the inherent complexity—i.e., shapes, sizes, distribution—of papillae in the clingfish served to inspire these designs of the textures. To do so, we employed image processing algorithms used in computer science applications to understand the attributes of biological structures involved in adhesion.

The geometry of the papillae helps to leverage hydrodynamic forces for rate-dependent adhesion, which would be crucial in the turbulent intertidal habitat of the clingfish. Accordingly, the object of the analysis was to replicate these structures in an artificial surface texture.

Figure 1A:
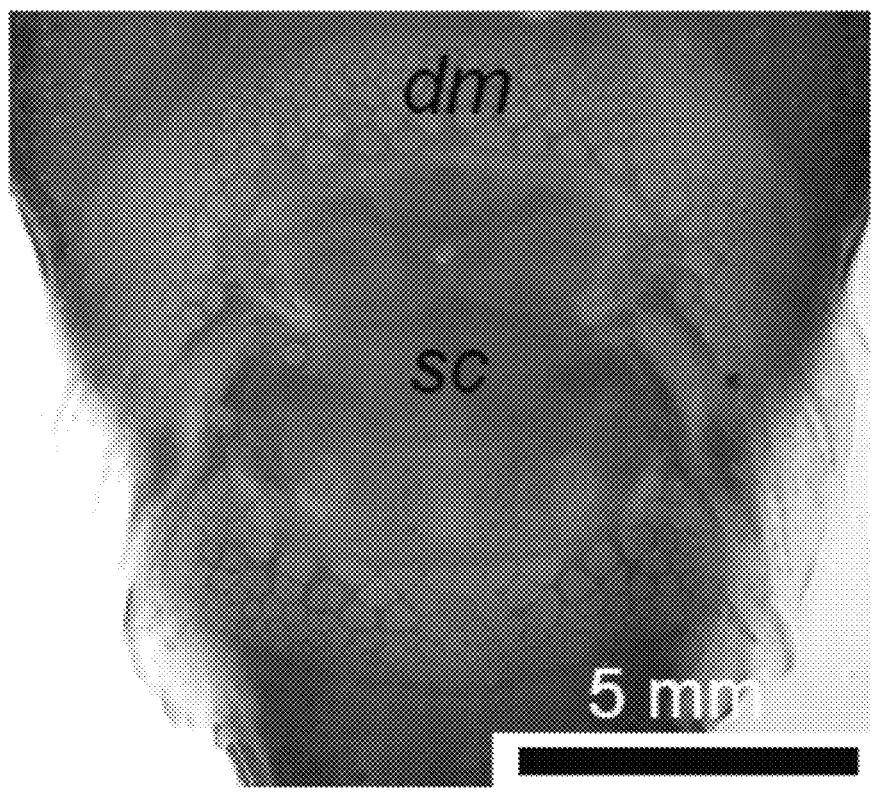
FIG. 1A is a photographic image of the ventral view of the suction disc of a live clingfish.
Figure 1B:
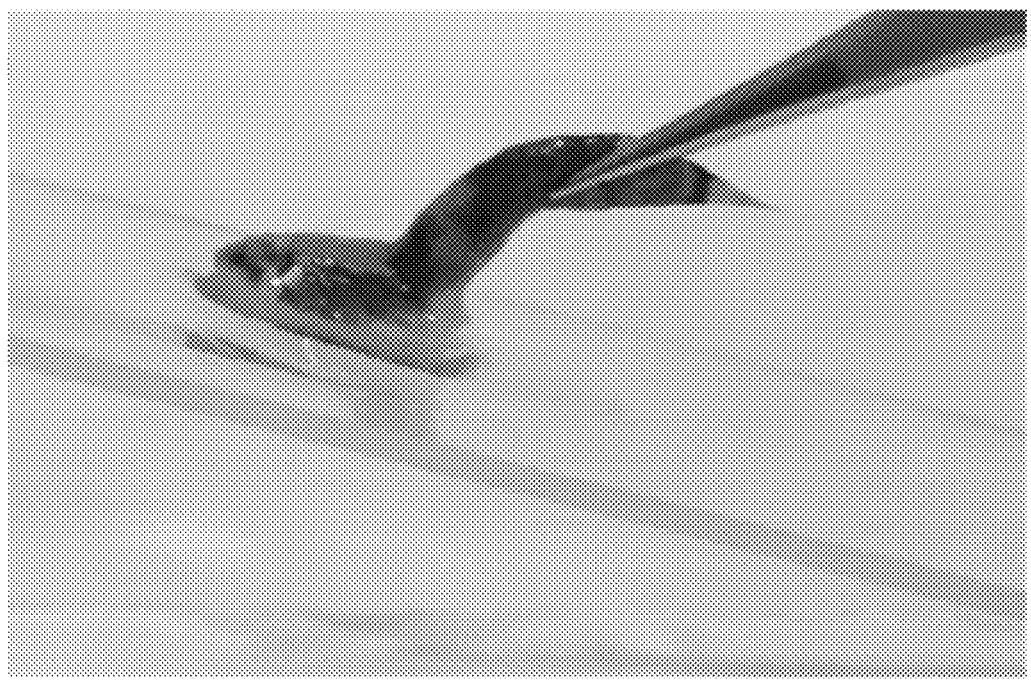
FIG. 1B is a photographic side view of a euthanized clingfish adhered to a glass surface.
Figure 1C:
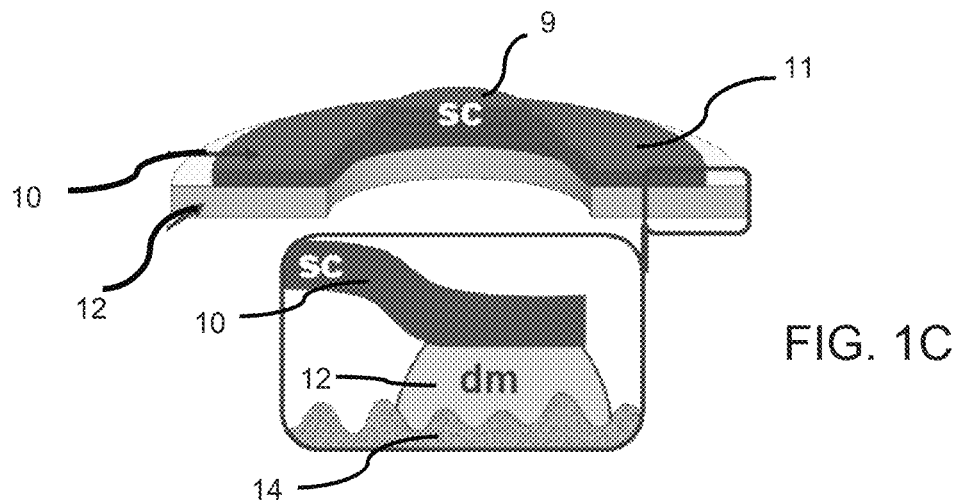
FIG. 1C provides a schematic of an exemplary embodiment of a bioinspired suction disc without microstructures.
Figure 1D:
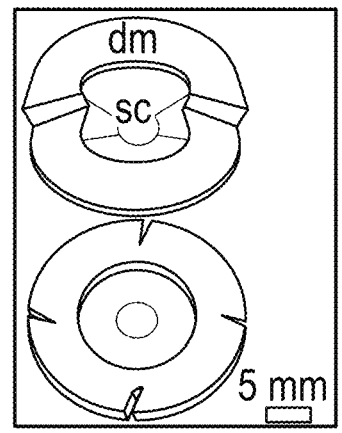
FIG. 1D provides images of two prototypes of a suction disc.

FIG. 1A is a photographic image of the ventral view of the suction disc of a live clingfish. The suction chamber ("sc") 10 is lined along its perimeter with a disc margin ("dm"). FIG. 1B is a photographic side view of a euthanized clingfish adhered to a glass surface. FIG. 1C provides a schematic of an exemplary embodiment of a bioinspired suction disc without microstructures. The suction chamber ("sc") 10 indicated by the dark area is formed from a relatively stiff silicone to define a concave structure which has a cross-section that is suggestive of a wide gaussian curve with relatively long tails, or a skirt portion 11, and a partially flattened arch 9, as shown. The inset illustrates how the suction chamber forms a cavity of sub-ambient pressure that is lined along its perimeter by a disc margin (dm) 12, a relatively soft, compliant silicone indicated in lighter gray, which may extend beyond the perimeter of skirt portion 11. The soft, elastomeric layer of the disc margin 12 conforms to irregularities of surface 14. FIG. 1D provides images of two prototypes, where the upper disc is a bilaterally symmetric suction disc with two slits, which assist with conformability to surfaces. The soft layer of the disc margin (dm) 12 is formed using Ecoflex™ 00-30 silicone elastomer, which has a Shore A hardness of 00-30, tensile strength of 200 psi, and 100% modulus of 10 psi. (Additional data are available from the manufacturer Smooth-On, Inc.) The suction chamber (sc) 10 is formed from Dragon Skin™ 20 silicone elastomer, also from Smooth-On, Inc., which, when cured, has a Shore A hardness of 20, tensile strength of 550 psi, and a 100% modulus of 49 psi. (Additional data are available from the manufacturer.) The lower disc in FIG. 1D is a radially symmetric suction disc with four slits in the disc margin. (Scale bar, 5 mm.)

Figure 1E:
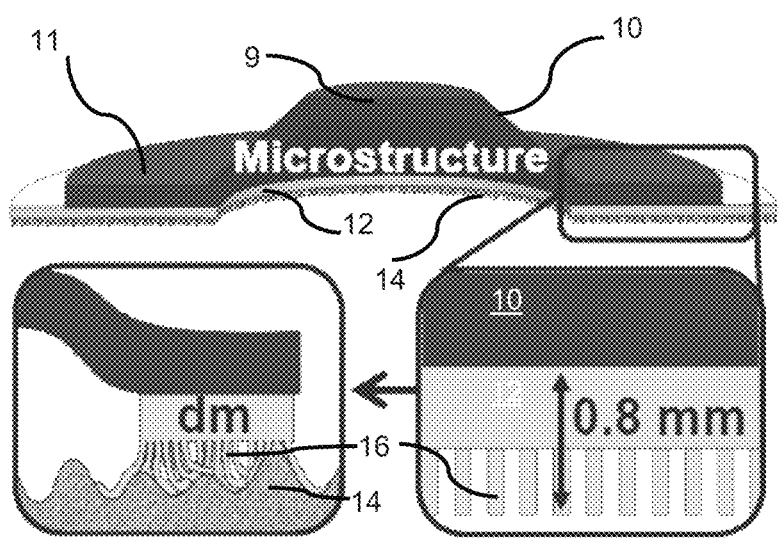
FIG. 1E is a schematic of a suction disc with micropillars according to another embodiment.
Figure 1F:
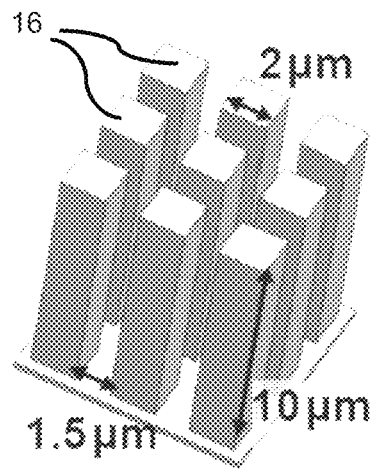
FIG. 1F is a schematic of micropillars of the embodiment of FIG. 1E.

FIG. 1E is a schematic of a suction disc with micropillars lining the disc margin 12. In this example, the disc margin thickness is shown as 0.8 mm, but may range in thickness from about 0.4 mm to 2.0 mm. The inset shows micropillars 16 conforming to surface irregularities 14. Note that the microstructure images have been exaggerated for illustrative purposes. FIG. 1F is a schematic of exemplary micropillars 16. In the figures, the pillars are indicated to have dimensions of 2 μm cross-sectional area, height of 10 μm, and spacing of 1.5 μm. These dimensions are exemplary only. Typical dimension ranges will generally be plus/minus 50%, i.e., 1-3 μm cross-section×5-15 μm height×0.75-2.25 μm spacing.

Suction discs were designed using computer-aided design (CAD) software (Solidworks® from Dassault Systemes) and fabricated using molds created from a rigid material (VeroClear™ from Stratasys Ltd.) using a multimaterial 3D printer (Objet350 Connex3 from Stratasys Ltd.). After printing, the rigid molds were aged in an oven at 40° C. for 4 hours to ensure complete curing. The body geometries were circular, or in the bilateral geometry of the clingfish suction disc, in accordance with the analysis described below. The discs were molded with cylindrical stems approximately 8 mm in diameter and 10 mm in height to provide a gripping surface for the clamp during pull tests.

Figure 1I:
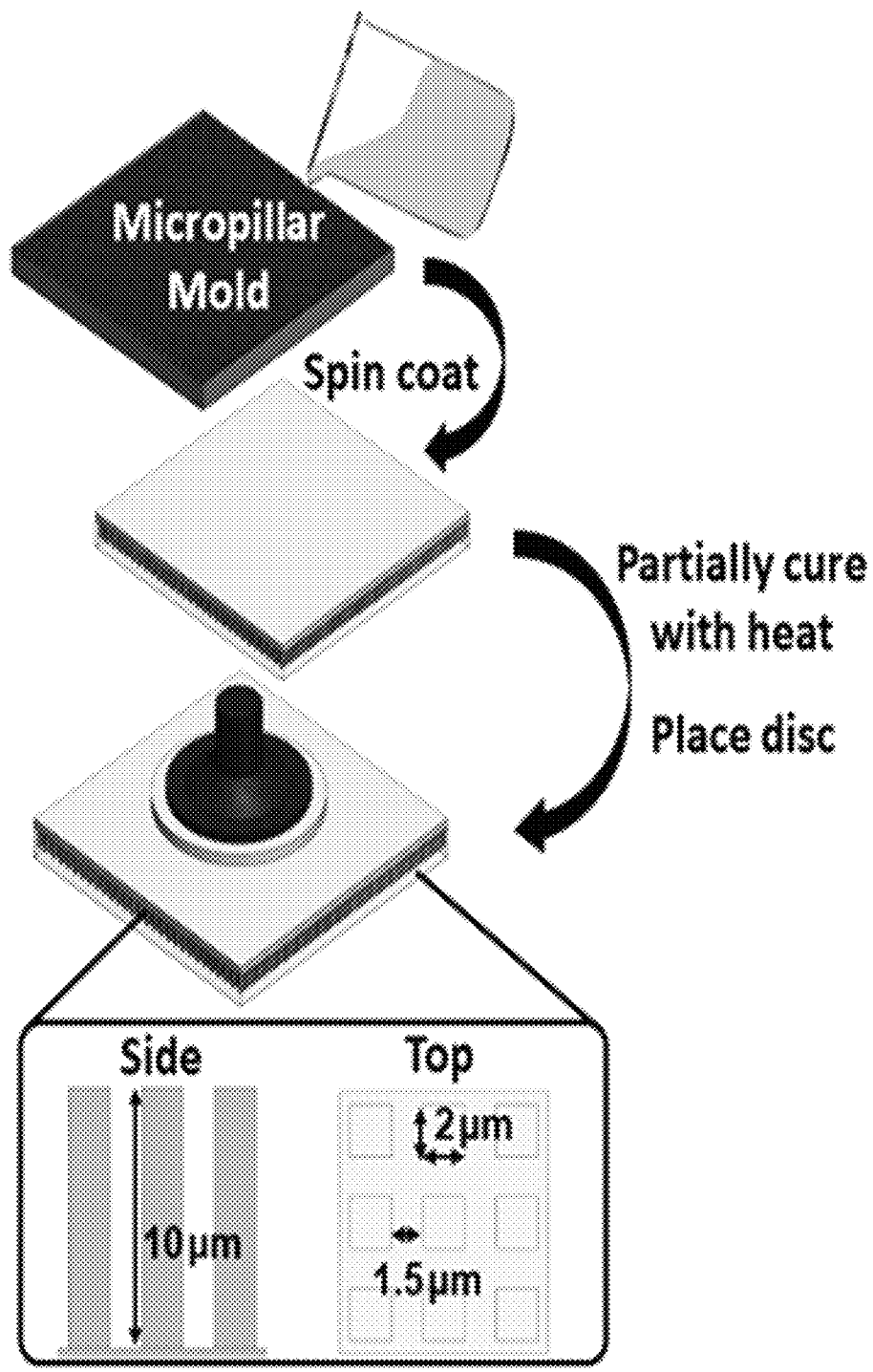

The suction chamber 10 of each disc was 4 mm in depth, the walls of which were molded from Elastomer #1, in this example, Dragon Skin™ 20 silicone elastomer. Referring to the sequence illustrated in FIG. 1G, molds containing elastomer #1 were placed in a vacuum chamber for approximately 5 minutes for de-gassing and then fully cured for 1.5 hours at 40° C. The soft layer disc margin 12 was formed using a 2 mm layer of Elastomer #2, i.e., Ecoflex™ 00-30 silicone elastomer, poured into the mold, as shown in FIG. 1I. As illustrated, optional slits were formed in the disc via partitions in the mold. To affix the disc margin 12 to the suction chamber 10, the mold containing Elastomer #2 was partially cured at 40° C. for 3 minutes. The suction chamber 10 was placed onto the partially cured Elastomer #2 and set to cure for 1 hour at 30° C.

FIG. 1I illustrates an exemplary sequence for formation of the micropillars, which were fabricated using a mold provided by NASA Jet Propulsion Laboratory, by casting silicone elastomer (Ecoflex™ 00-30 or Dragon Skin™ 20) onto a wax mold with the microfeature geometry. The wax mold and silicone were spun at 800 rpm for 30 seconds and partially cured at 40° C. for 3 minutes. The remaining layers of the suction disc were then placed in contact with the micropillar layer, and the entire assembly was cured at 40° C. for 15 minutes.

Figure 2A:
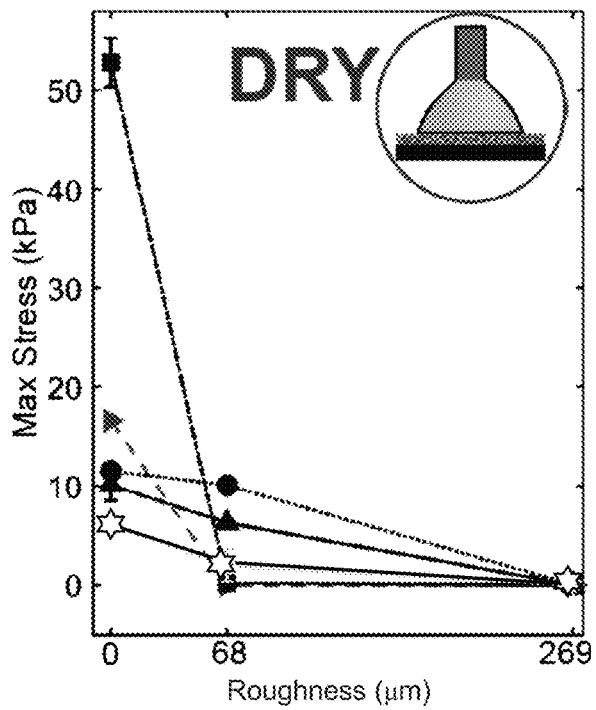
FIGS. 2A-2B demonstrate adhesion performance of the elastomeric suction discs without micropillars to rough surfaces in air and in water, respectively.
Figure 2B:
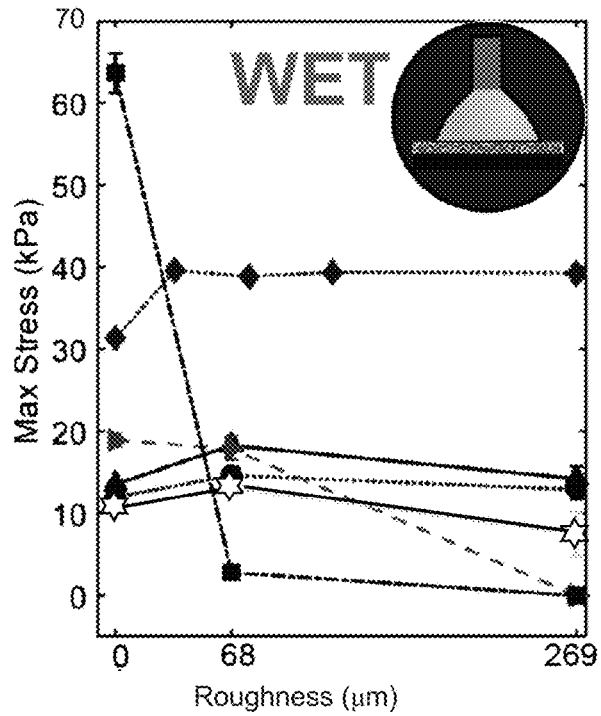
Figure 2C:
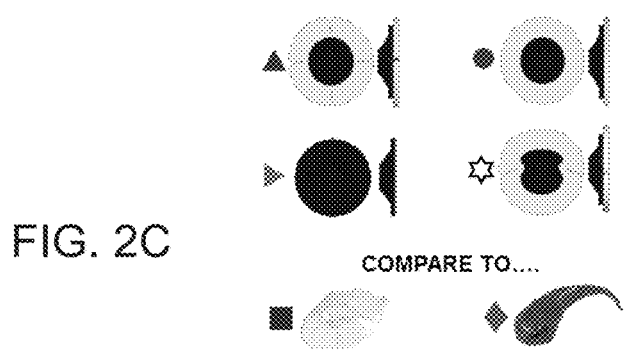
FIG. 2C provides a legend for the symbols in FIGS. 2A and 2B.
Figure 2D:
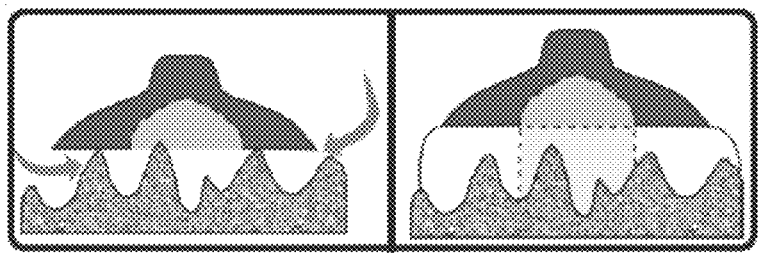
FIG. 2D is a schematic of the effects of the soft layer in the disc margin on sealing to surface irregularities.

FIGS. 2A-2D demonstrate adhesion performance of the elastomeric suction discs (without micropillars) to rough surfaces, where FIG. 2A provides average maximum adhesive stress curves for a disc without micropillars across flat, rough surfaces in air; FIG. 2B shows results for a disc without micropillars, average (n=3; ±Std Dev) across flat, rough surfaces in water; FIG. 2C provides a legend for the symbols used in FIGS. 2A and 2B corresponding to schematics of the different prototypes and controls. The graphics show the soft silicone layer (e.g., Ecoflex™) as light grey and the stiff silicone backing of suction chamber as black. Suction disc variants (no micropillars) are radially symmetric with four slits and soft layer (triangle); radially symmetric with soft layer and without slits (circle); radially symmetric with stiff disc margin (arrow); bilaterally symmetric with soft layer (star); commercially available suction cup (square). Clingfish adhesive stress, median values shown, data from Wainwright et al. 2013 (diamond). FIG. 2D is a schematic showing the effects of the soft layer in the disc margin on sealing to surface irregularities. Stiff backing (dark colored), soft silicone (light colored).

To study the clingfish adhesion mechanism, we disrupted the seal of the suction disc by gently prodding the intersection of the pelvic and pectoral fins, referred to in previous work as a "vent." When the suction chamber was disrupted, the disc remained adhered using other modes of adhesion that therefore excluded suction. As the disc margin detached from the surface (t>0.3 s), the papillae were the last in contact. The fish specimen detached itself by peeling its body laterally from the surface. Overall, the ability of the papillae to remain attached to the imaging surface after suction was removed suggested additional adhesive capabilities associated with the papillae, supplementary to sealing the suction chamber.

We conducted our study of suction disc morphologies across five preserved specimens (*Gobiesox maeandricus*) of different sizes, denoted as Size I-V, ordered by increasing body size. Specimen ranged from a body length of 37 mm (Size I; 0.54 g, weight) to 69 mm (Size V; 4.29 g, weight). Table 1 lists the sizes and weights of the clingfish specimen. Specimen were measured and weighed prior to imaging.

TABLE 1

| Size | Weight (g) | Body Length (mm) | Suction Disc Diameter (mm) |
|---|---|---|---|
| I | 0.54 | 37 | 4.6 |
| II | 1.16 | 45 | 6.0 |
| III | 1.40 | 50 | 6.2 |
| IV | 3.97 | 65 | 8.5 |
| V | 4.29 | 69 | 9.2 |

The diameter of the suction disc linearly corresponded to both body size and weight of the clingfish. The total count of papillae per specimen exhibited a positive correlation with body length. The fewest number of papillae, which totaled 800, was counted for the smallest specimen (Size I). The greatest number of papillae, 1179, was counted for the largest specimen (Size V). The quality of preservation varied across specimens, leading to a limited uncertainty on the count of papillae (this uncertainty was estimated to <7% based on the extent of damaged areas.

Table 2 lists the computed values of geometric attributes of papillae. The average area of an individual papilla increased from $1.27 \pm 0.85 \times 10^4$ μm$^2$ for the smallest specimen (Size I, n=800 papillae) to $2.08 \pm 1.56 \times 10^4$ μm$^2$ (Size V, n=1179 papillae).

TABLE 2

| Size | Body Length (mm) | Total Papillae (Count) | Max Area (×10$^4$ μ$^2$) | Min Area (×10$^4$ μ$^2$) | Avg. Area (×10$^4$ μ$^2$ ± SD) | Avg. Aspect Ratio (±SD) | Avg. Min. Channel Width (μ ± SD) |
|---|---|---|---|---|---|---|---|
| I | 37 | 800 | 5.68 | 0.086 | 1.27 ± 0.85 | 1.36 ± 0.36 | 9.10 ± 2.73 |
| II | 45 | 1084 | 4.60 | 0.041 | 0.80 ± 0.58 | 1.25 ± 0.25 | 7.12 ± 1.92 |
| III | 50 | 974 | 3.65 | 0.036 | 0.86 ± 0.61 | 1.37 ± 0.33 | 8.73 ± 2.63 |
| IV | 65 | 813 | 11.83 | 0.198 | 2.38 ± 1.58 | 1.33 ± 0.29 | 9.34 ± 3.10 |
| V | 69 | 1179 | 9.83 | 0.060 | 2.08 ± 1.56 | 1.36 ± 0.33 | 5.94 ± 1.34 |

The power-law relationship between the surface area of an individual papilla (A) and body length (l), with a scaling exponent (m) and constant (k) was determined using the relationship $$A = k \cdot l^m \tag{1}$$

To calculate the scaling exponent and constant, the data was log transformed followed by a linear regression.

$$\log(A) = m \log(l) + \log(k) \tag{2}$$

The relationship between the surface area of a papilla and body length was defined by a scaling exponent of 1.3, when considering data from all papillae across all specimens (FIG.

2 a; n=4,850; p=0.13; $r^2$-value, 0.60). Given the large variability in the surface areas across the entirety of the suction disc, this trend was also quantified by considering only the 50 largest papillae of each individual (FIG. 3A), which identified a more defined relationship between body length and surface area of the 50 largest papillae, with a scaling exponent of 1.5 (n=250; p<0.05; $r^2$-value, 0.81). The scaling exponent between 1.3 and 1.5 signified that the body size has a positive, nonlinear effect on the size of the papillae.

Other groups of clingfish, such as the much larger Chilean clingfish (*Sicyases sanguineus*), demonstrated a similar relationship with body size and surface area. For example, in samples of preserved Chilean clingfish (body length, 29.4 cm; disc diameter, 11.6 cm), the papillae measured to surface areas of roughly $1.9-3.0\times10^7$ $\mu m^2$, two orders of magnitude greater than the papillae of *Gobiesox maeandricus*.

In an evaluation of the distributions of papillae based on surface area across the entirety of each suction disc (FIGS. 3B, 3C), the distributions of surface area were found to exhibit a right-skewed asymmetry, and thus a larger concentration of smaller papillae across every size of suction disc. The kernel probability distributions of surface area also showed a right-skewed asymmetry across all body sizes (FIG. 3D), leading to the conclusion that the suction disc of the clingfish favors a larger density of smaller papillae, which trend is independent of body size.

To understand the spatial distribution of papillae based on area, we normalized ($A_{norm}$) the surface area of an individual papilla ($A_i$) to that of the largest papilla ($A_{max}$) for each suction disc ($A_{norm}=A_i/A_{max}$), which helped to elucidate trends in papillae distribution across different body sizes. For each of the five suction discs, the distribution of $A_{norm}$ was mapped to a binary image, which was generated by isolating the papillae, or regions of interest, from the original micrographs. To demonstrate spatial trends across the range of body sizes, we looked at representative examples of small (Size II) and large (Size V) body sizes.

As demonstrated in Sizes II and V, a clear trend was observed in the distribution of papillae when considering their surface area. There was a decrease in the surface areas of the papillae progressing from the center of the disc along the radius to the outermost perimeter. The largest papillae ($A_{norm}>0.80$) were found to be located along the innermost radius of the anterior and posterior regions of the suction disc. Conversely, the smallest papillae ($A_{norm}<0.20$) were located consistently along the outermost radius of the disc. On average, eight rows of papillae were expressed in both the anterior and posterior regions of the suction disc, irrespective of body size. The lateral regions of the disc margin exhibited a greater concentration of small papillae ($A_{norm}<0.20$), with comparison to both anterior and posterior regions. These trends were consistent across all five body sizes of the clingfish specimen.

Figure 4:
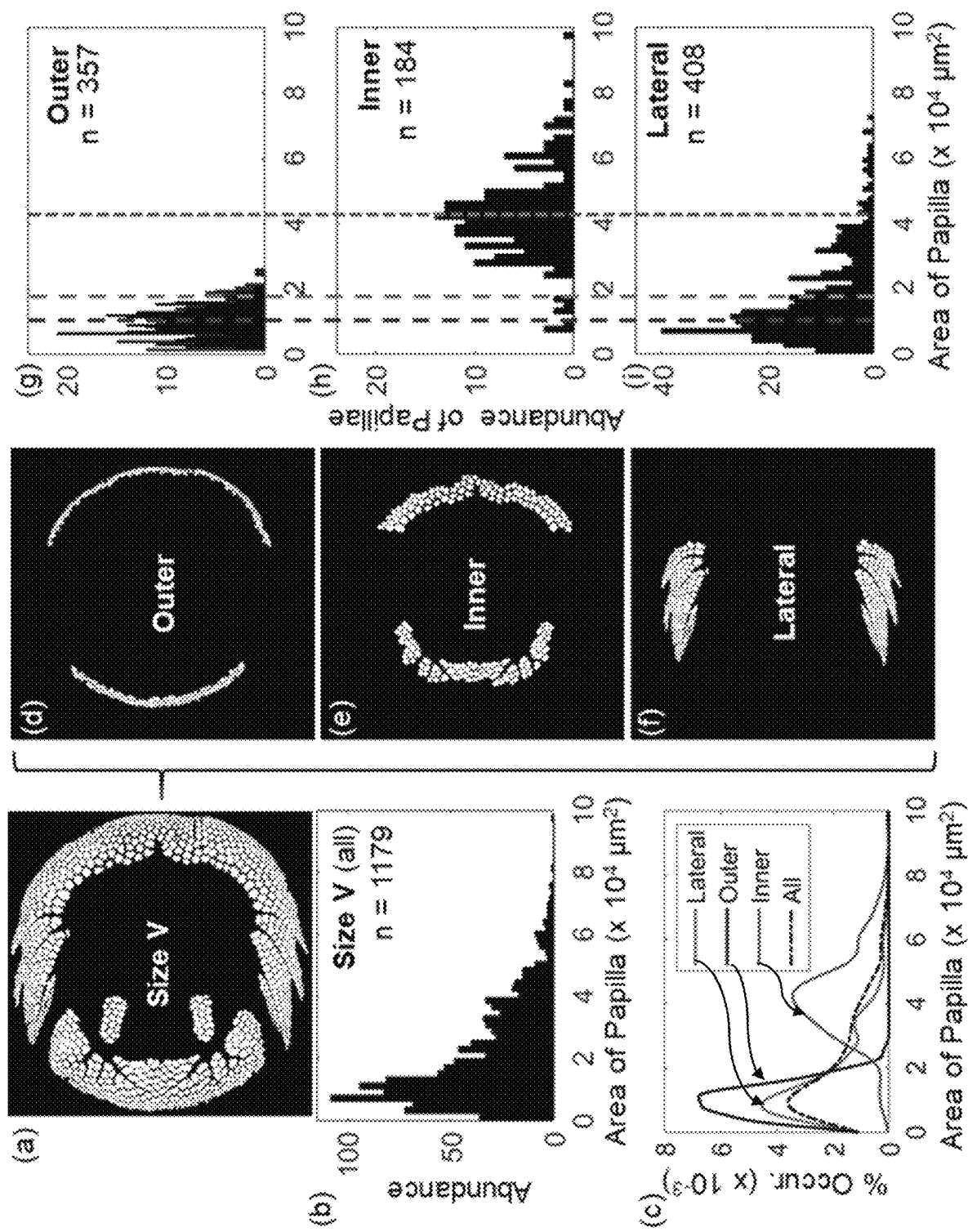
FIG. 4 illustrates segmentation of suction disc for analysis of spatial distribution of papillae based on size.

To understand the probability density functions of papillae based on location along the suction disc, one suction disc (Size V) was segmented based on region, differentiating between the anterior, posterior, and lateral components of the disc margin. Of the anterior and posterior, the disc was deconstructed into the components of "inner" (three rows, innermost radius) and "outer" (two rows, outermost radius). The lateral components of the disc margin (FIG. 4, Panels a, d-f) were also isolated and counted for the outer, inner, and lateral components, finding a total of 357, 184, and 408 papillae, respectively. Kernel probability distributions were determined for the isolated regions (FIG. 4, Panel c). Similar to the heat maps, the outermost regions contained the greatest abundance of small papillae, with an average area of $1.00\pm0.50\times10^4$ $\mu m^2$ (FIG. 4, Panel g) and left-most dashed line. The innermost regions contained the greatest abundance of large papillae, with an average area of $4.27\pm1.40\times10^4$ $\mu m^2$ (FIG. 4, Panel h) and right-most dashed line. Along the radius, the papillae increased in size roughly 4.2 times from the outermost to the innermost rows. The distributions of size were symmetric for both the inner and outer regions of the anterior and posterior disc margin (FIG. 4, Panel c). Conversely, we observed a right-skewed asymmetry in the distribution of surface area for the lateral fin regions, consistent with a greater, but non-homogenous, concentration of small papillae (FIG. 4, Panel i).

An image processing procedure was used to automatically calculate the aspect ratio across all papillae of the suction disc. The aspect ratio is a measure of the elongation of a papilla. To perform this calculation, the program automatically detected each papilla and drew the minimum bounding box around the region of interest such that all sides and vertices were included. The aspect ratio was then calculated as the division of the longest side (l) of the bounding box by the shortest side (w, aspect ratio=l/w).

Figure 5A:
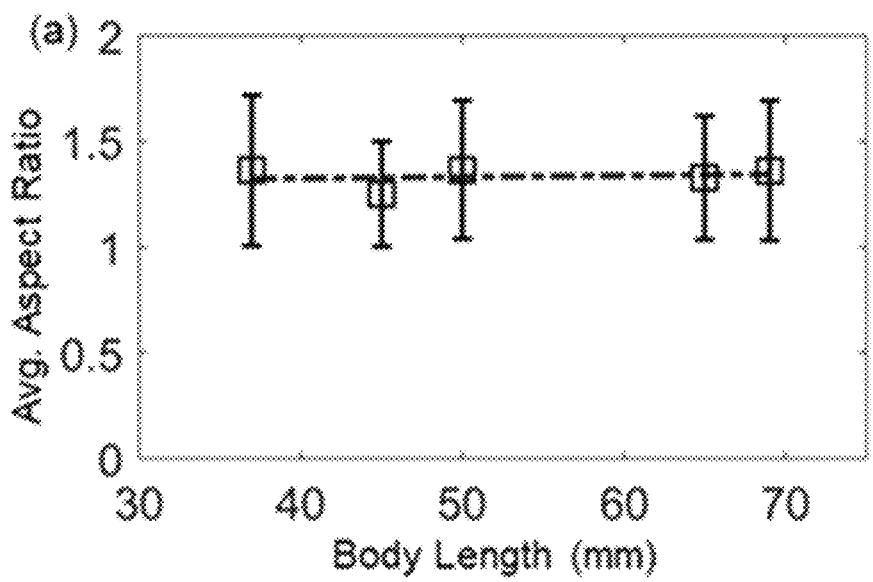
FIGS. 5A-5B characterize aspect ratio and channel width for an idealized, average papilla, where

The average aspect ratio of the papilla was consistent across the body sizes, centered around 1.3 (FIG. 5A), suggesting that the aspect ratio of the papillae was independent of the body size of the clingfish. Comparing the specimen, the lowest average aspect ratio was calculated to be $1.25\pm0.25$ (Size II, n=1084), whereas the largest ratio was $1.37\pm0.33$ (Size III, n=974). For comparison, a regular hexagon has an aspect ratio of 1.15, leading to the conclusion that the papillae are elongated structures.

Mapping the aspect ratio to the binary image of the suction disc for all body sizes, a greater concentration of elongated papillae was found along the outer perimeter of the suction disc and along the lateral fin regions while fewer elongated papillae were found along the anterior, innermost region of the suction disc. There was also a high abundance of elongated papillae at the innermost region of the posterior margin. The anterior and posterior papillae therefore exhibited divergent behaviors. Thus, the distribution of elongated papillae differed depending on the location along the suction disc.

The orientation of an elongated papilla was also dependent on its location. The outermost papillae of the anterior disc margin were elongated laterally, parallel to the contour of the outer disc margin. In contrast, the outermost papillae of the posterior disc margin were elongated anteroposteriorly, perpendicular to the contour of the outer disc margin. The innermost papillae of the posterior margin exhibited lateral elongation, tangent to the contour of the inner disc margin. The observations in elongation and orientations were consistent across body sizes. Without intending to be bound by theory, it is believed that the differences in orientations may play a role in reinforcing the perimeter of the suction chamber.

The channels between the papillae appear to function to shuttle fluid from the contact area, thereby reducing the distance of separation and lowering the papillae to the surface. Earlier work has demonstrated that microchannels surrounding surface structures used in wet adhesion channel fluid from beneath the biological adhesive pads, thus reducing the distance of separation between the epithelium to the surface on which the animal is attached.

To understand the microchannels used by the clingfish, a separate processing technique was used to calculate the minimum channel width between papillae. For every pixel along the circumference of a papilla, the distance to its nearest neighboring papilla was calculated. The 5 smallest distances per papilla were averaged to report the minimum distance to its neighbor, which was considered to be the minimum channel width. This computation was performed across the entirety of the suction disc, and the average per disc was then calculated.

Figure 5B:
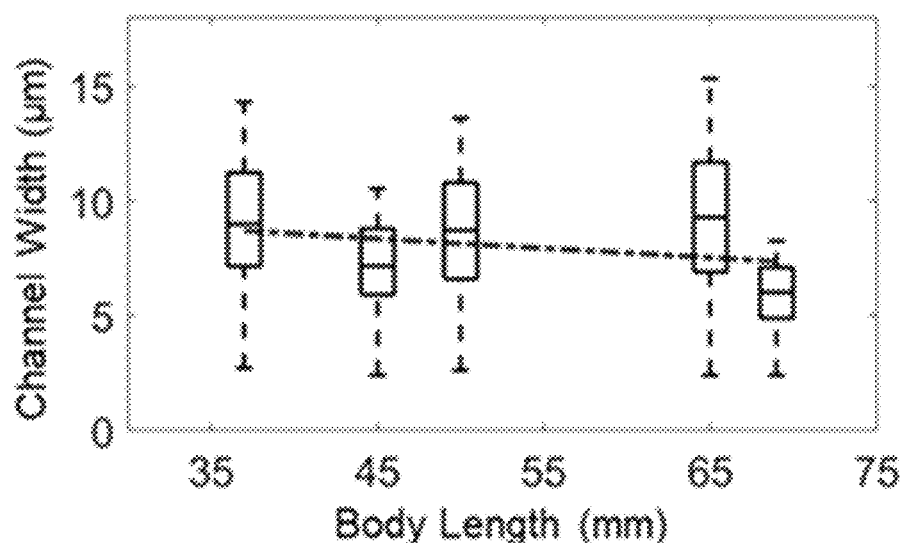
Figure 5C:
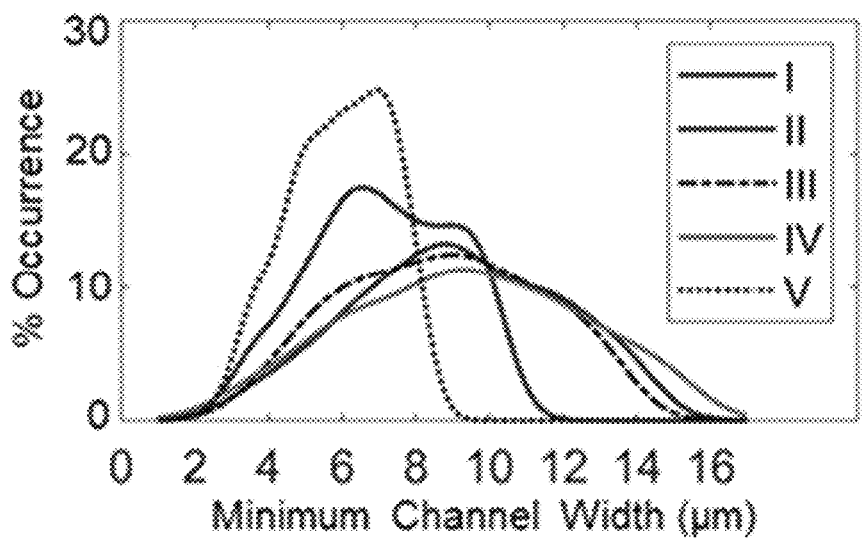
FIG. 5C plots the kernel probability distributions of the minimum channel widths for body sizes I-V.

The minimum channel spacing between papillae was consistent and of the same order of magnitude, ranging between 9.1±2.7 μm (Size I) and 5.9±1.3 μm (Size V) for the smallest and largest body sizes, respectively (FIG. 5B, where the linear fit of data is shown by the dashed line; slope: −0.04; y-intercept: 10.2).) The largest body size (V) exhibited the smallest average channel width, whereas the smallest body size (I) exhibited the second largest channel width, resulting in a negatively sloped trend line. The probability distributions of channel width were symmetrical and did not exhibit skewness (FIG. 5C).

The channel width appeared to be affected by the degree of degradation of the specimen. A more degraded disc exhibited a loss of papillae along the outer perimeter, which by observation had narrower channels. Therefore, specimens, such as Size V, that were better preserved generally had a smaller average channel spacing. Taking this into account, overall the channel width was determined to be independent of body size, and was centered around an average spacing of 8.05 μm across the five specimens.

To characterize the predominant shape of the papilla for the largest clingfish specimen (Size V), a binary image (FIG. 6, Panel a) was generated and labeled according to the number of sides of the structures. This task was performed manually by visually examining the original micrographs, where the number of sides was clearly delineated. The binary image, by contrast, exhibited smoothing of the vertices of the shapes, rending subtle side lengths indistinguishable to automated image processing techniques.

Figure 6:
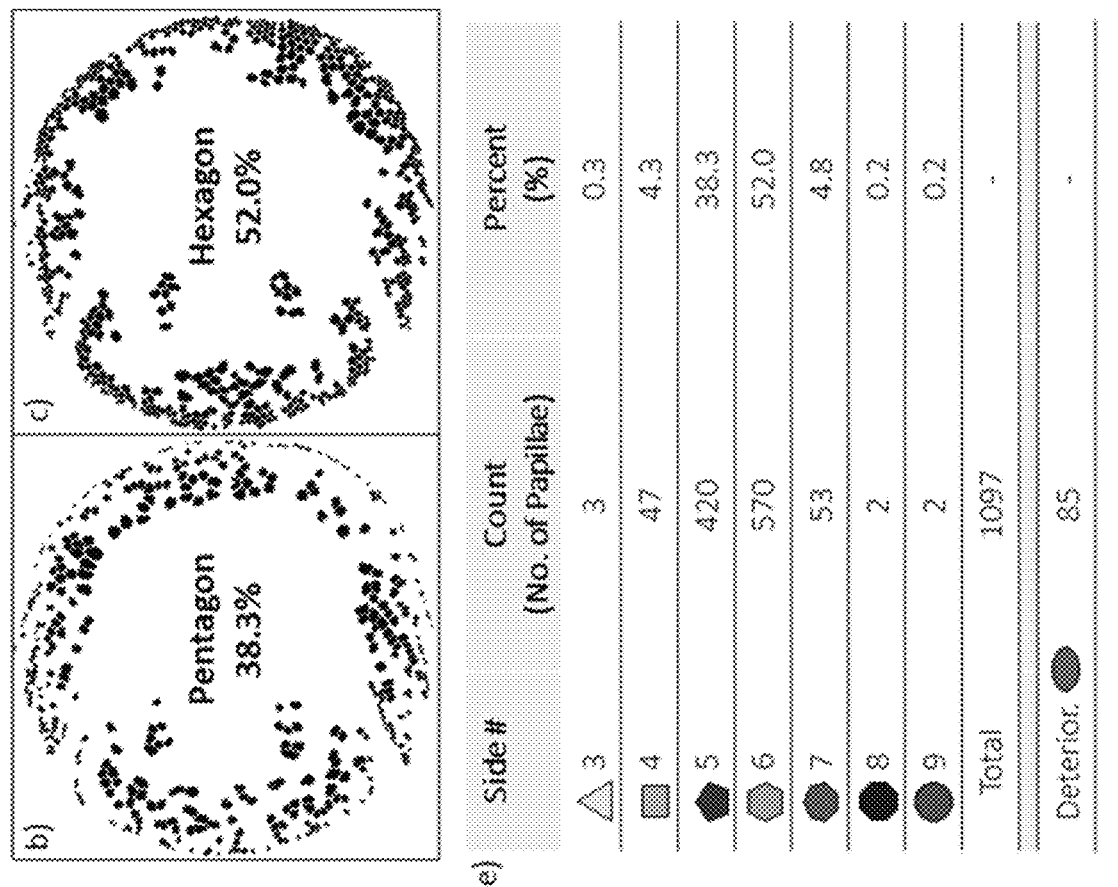
FIG. 6 illustrates analysis of geometric shape of papillae across a suction disc for a clingfish with a table detailing the abundance and percent occurrence of the different shapes.
Figure 6:
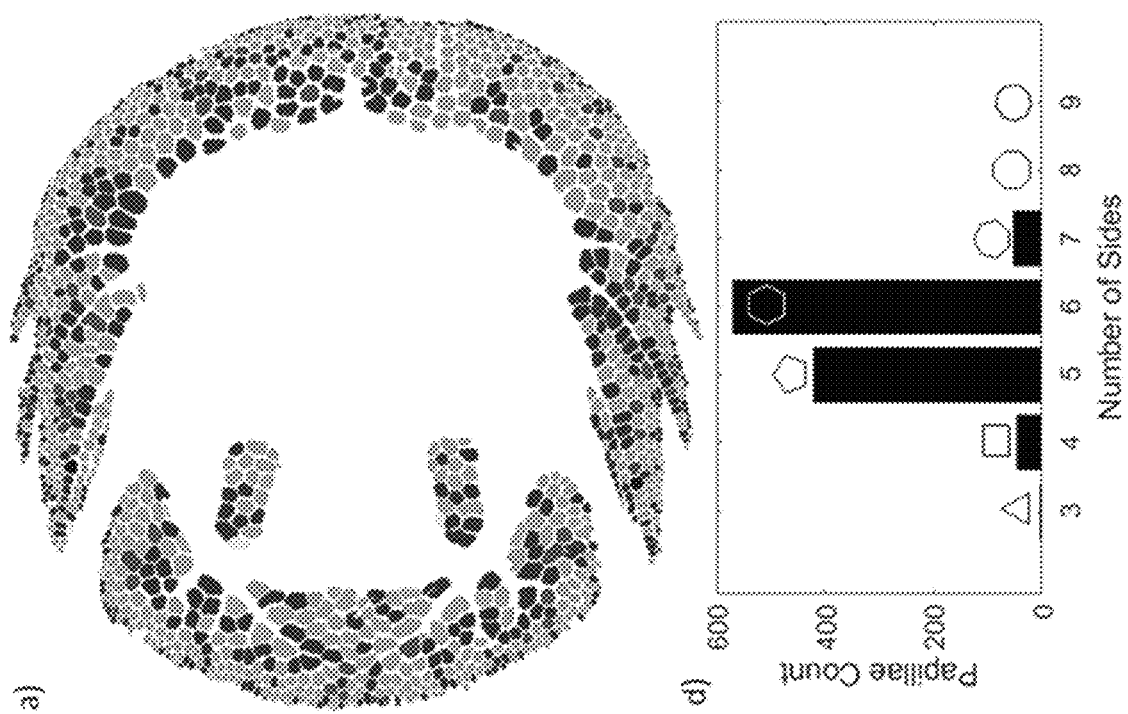

Of the papillae in Size V, 52% were hexagonally shaped (FIG. 6, Panels c, d). The second most abundant shape was pentagonal, representing 38.3% of all papillae (FIG. 6, Panels b, d). The prevalence of other shapes fell considerably to 4.8% and 4.3% for heptagons and quadrilaterals, respectively (FIG. 6, Panel e). 85 of the papillae were considered to be too deteriorated to yield a definitive conclusion on shape, indicated in Panel e) as "Deterior."

Figure 7:
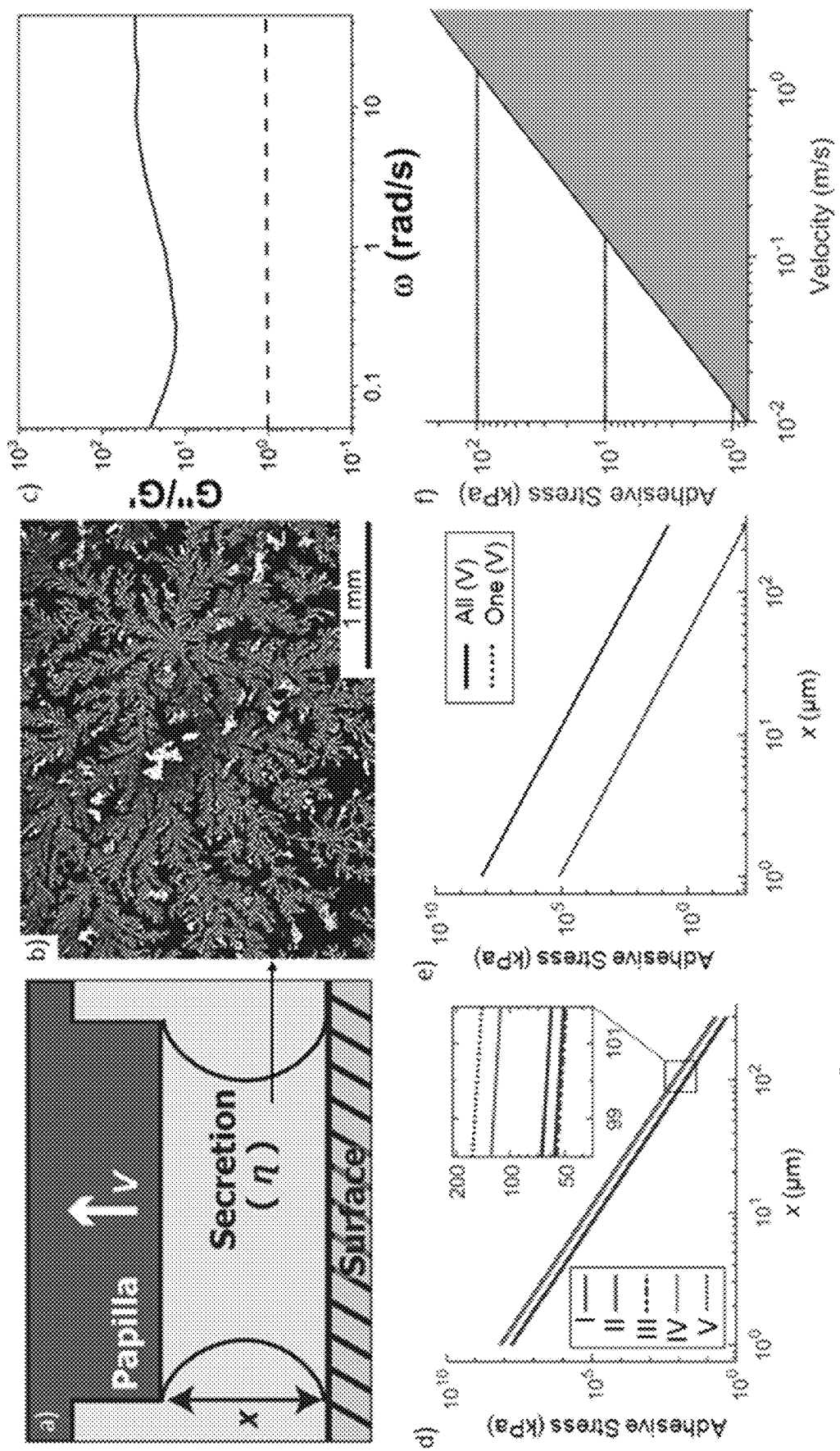
FIG. 7 provides the results of an evaluation of viscoelastic properties of the papillae and measurement of adhesive stress.

In the map detailing the distribution of shapes, higher concentrations of pentagons were found along the inner and outermost perimeters of the suction disc, and also along the lateral fin rays. Conversely, hexagonal structures were most prevalent filling in the space between the inner and outer perimeters. There was an appreciable presence of shapes that have fewer than five sides or more than six, suggesting that the prevalence of such shapes aided with packing the non-uniform surface of the disc margin of the clingfish. Referring to FIG. 7, panels a)-c), the linear viscoelastic properties of the secretions found beneath the suction disc were investigated. Using optical microscopy, the dried secretions were observed to crystallize into a ferning pattern, indicative of a mucosal contribution to its composition (FIG. 7, panel b). Passive microrheological measurements of the clingfish secretion was used to determine the elastic modulus ($G'(\omega)$), viscous modulus ($G''(\omega)$), and viscosity. The viscous modulus was more than an order of magnitude larger than the elastic modulus at all explored frequencies (FIG. 7, panel c). This finding indicated that the secretion behaves as a viscous, not viscoelastic, fluid at nano- and microscales of interaction. The viscosity of the secretion was calculated to be 6.5±1 mPa·s; by comparison, the viscosity of water is 1 mPa·s. The value of viscosity calculated from the microrheological experiments was then used to model its impact on hydrodynamic adhesion across the entirety of the suction disc.

With an understanding of the geometric characteristics of the papillae and microrheological properties of the secretion, their contributions to hydrodynamic adhesion were estimated. The secretions produced by live clingfish fill the space between the papillae and a surface and would resist axial separation. Hydrodynamic adhesion perpendicular to the surface (Stefan adhesion, $F_{stef}$) can be modeled for the case of two parallel, rigid, circular plates of radius (r) separated from each other by a distance (x) (FIG. 7, panel a). A fluid layer of viscosity (η) fills the space between the two plates, which separate with a relative velocity ($V=\partial x/\partial t$). The resistance to separation is the rate-dependent adhesive force. Generalizing the calculation of Stefan adhesion to Equation (3) to consider surface area of the papilla (A) accounted for non-circular surface geometries.

$$F_{Stef} = \frac{3\pi r^4 \eta}{2x^3}\frac{\partial x}{\partial t} \approx \frac{3A^2 \eta}{2\pi x^3}\frac{\partial x}{\partial t} \qquad (3)$$

By Equation (3), when pulled axially, Stefan adhesion is directly proportional to the rate of the disturbance, viscosity of the secretion, and surface area of the papillae. Adhesion is inversely related to the distance of separation between a papilla and the surface to which it is adhered. Therefore, by reducing the distance of separation, the papillae can increase the contribution of adhesion due to viscous forces.

Using Equation (3) to model the influence of papillae on adhesion, either the distance of separation or the velocity of an axial disturbance was varied. Adhesive stress ($\sigma_{stef}$) was calculated as the amount of resistance to separation due to hydrodynamic forces ($F_{stef}$) as a function of the contact surface area (A) ($\sigma_{stef}=F_{stef}/A$). In the models, the viscosity of the secretion was set to be 6.5 mPa·s, as determined from the microrheological experiments.

The impact of separation distance on adhesion was modeled for a range of separation distances, varying from 1 to 300 μm. This range was selected based on previous literature in tree frogs, which reported a distance of separation that varied between 5 and 300 μm. The velocity of disturbance was assumed to be 2 m/s based on an estimate of the forces experienced by the clingfish in its natural habitat. The adhesive stresses across the five body sizes all exhibited exponential decay given an increasing distance of separation from the surface (FIG. 7, Panel d). In other words, the greater the distance to the surface, the smaller the role the papillae have in adhesion. Additionally, the largest of the clingfish body sizes (V) was modeled to have between 2.5 and 3 times greater adhesive stress than the smallest of body sizes (I, II).

The cumulative effect of papillae on adhesion was modeled for one specimen: Size V (FIG. 7, Panel e). The surface area of the single papilla, labelled as "one," was the average surface area computed for Size V, $2.08\times10^4$ μm$^2$. The total surface area of Size V was calculated to be $2.46\times10^7$ μm$^2$. Adhesive stress across all the papillae of Size V was three orders of magnitude greater than that of a single papilla, hence the linear relation to area (FIG. 7, Panel c). In high abundances, the papillae greatly increase their collective surface area, thereby increasing their impact on Stefan adhesion.

The impact of velocity on adhesion was modeled given a disturbance acting perpendicularly on a clingfish (Size V; FIG. 7, Panel f). For this study, the distance of separation was fixed to 100 μm, an intermediate value from the previously reported range. The range of axial velocities was selected to be from 0 to 3 m/s since the body of a clingfish is projected to withstand disturbances between 2 and 3 m/s in the intertidal, while their habitat has registered wave surges up to 8 m/s. Turbulent fluid flow would result in an axial lift of the body of the clingfish. Axial velocity due to turbulence was approximated to be roughly equal to the velocity of the fluid in the environment.

Given that Stefan adhesion scales linearly with velocity, flow velocities of 0.01, 0.13, and 1.31 m/s resulted in adhesive stresses on the order of 1, 10, and 100 kPa, respectively. The linear relationship was represented on a logarithmic plot to emphasize the contribution of Stefan adhesion at velocities of different orders of magnitude. In sum, the velocity of an axial disturbance greatly influenced the adhesive stress achieved by the papillae. Stefan adhesion provided by the papillae would therefore be most beneficial in instances of disturbances of moderate to high velocities on the order of or greater to 0.1 m/s. The papillae could therefore act as a fail-safe to the suction disc, such that at higher vertical velocities of the clingfish due to a disturbance, the papillae would adhere with greater strength to a surface of the rocky intertidal. Adhesion of the papillae would ensure that the edge of the disc margin does not detach from its substrate which would compromise the sub-ambient pressure of the suction chamber.

Figure 8:
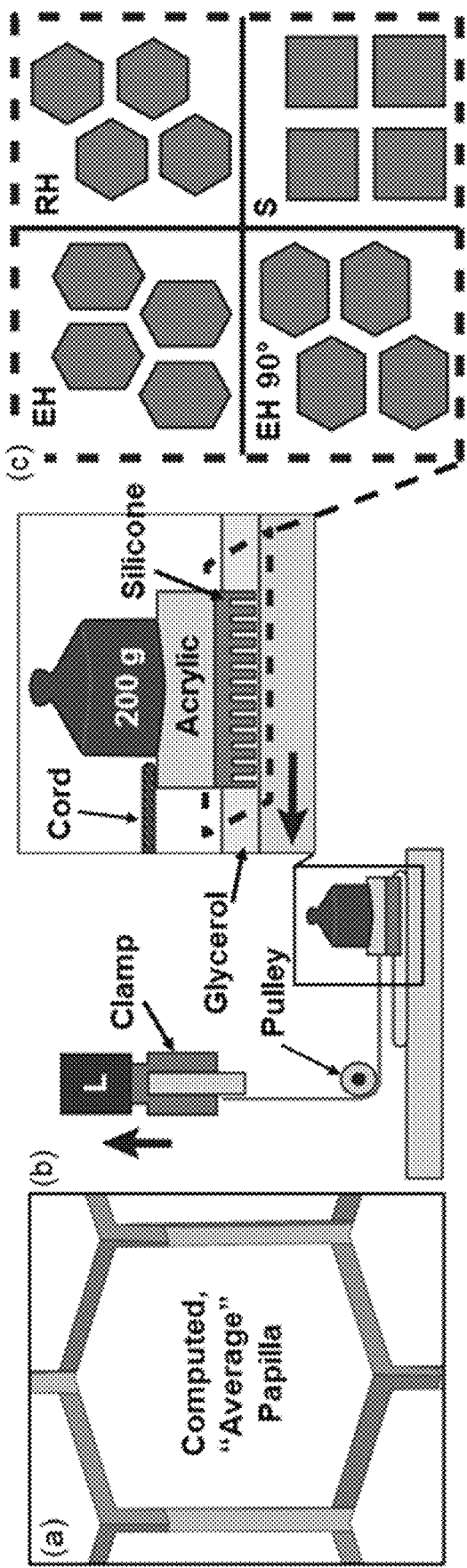
FIG. 8 diagrammatically illustrates a computed average papilla and empirical testing of a biomimetic surface pattern to determine the effect of the geometry of the papillae when subjected to shear forces.
Figure 8:
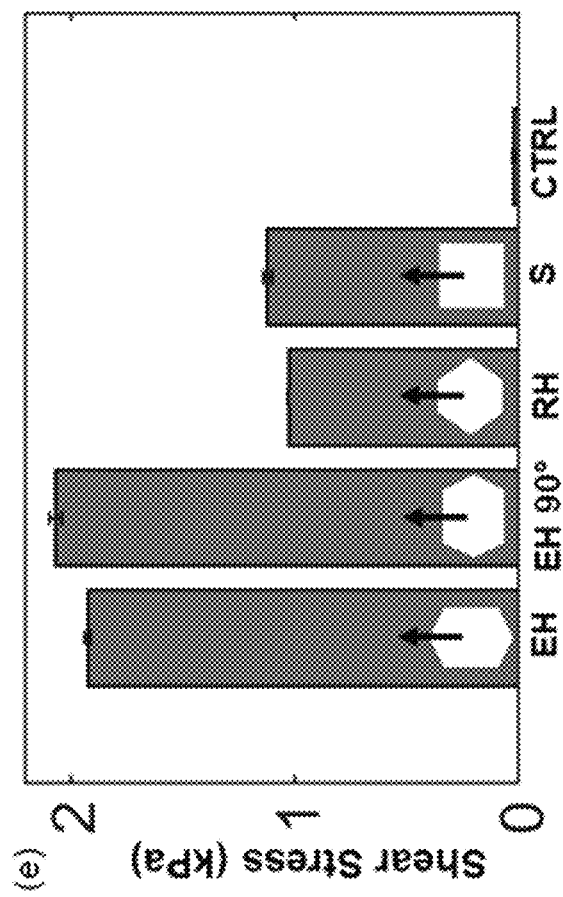
Figure 8:
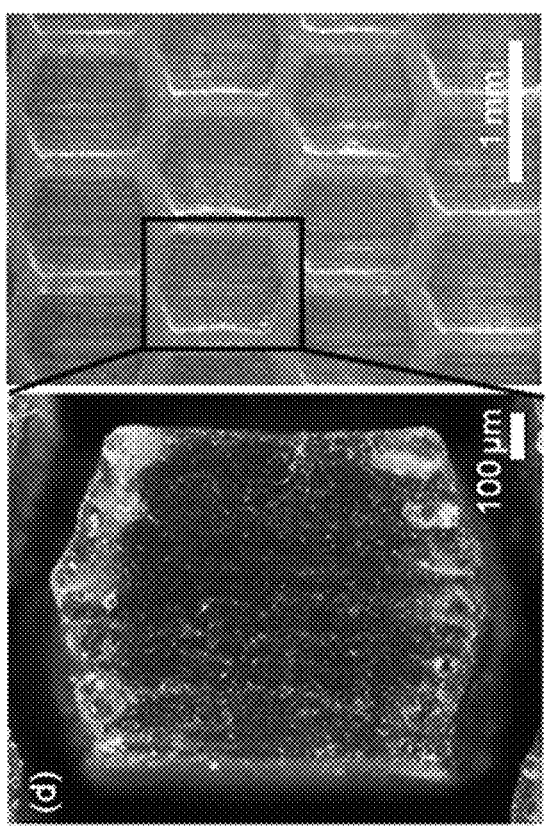

A biomimetic surface pattern was developed to empirically test the effect of the geometry of the papillae when subjected to shear forces (FIG. 8, Panels a)-e)). FIG. 8, Panel a) illustrates an "average" papilla, based on the average shape, channel width, surface area, and aspect ratio. FIG. 8, Panel b) diagrammatically illustrates an experimental setup used to validate the effect of the surface structures on shear stress. The surface structures were composed of silicone that were then bonded to a stiff acrylic backing. An inextensible cord was applied to the acrylic backings and routed through a frictionless pulley to a clamp connected to a load cell of a universal testing machine. A preload of 200 g was applied to the backing. FIG. 8, Panel c) provides schematics of the patterns tested, consisting of either elongated hexagons (EH), regular hexagons (RH), elongated hexagons oriented orthogonal to the direction of motion (EH90), or squares (S). All structures were designed with the same surface area. FIG. 8, Panel d) provides micrographs of the biomimetic surface structure (EH). All structures were composed of silicone. Scale bar, 100 μm. Inset: scale bar, 1 mm.

An "average" papilla was computed with a slightly elongated hexagon ("EH", with an aspect ratio of 1.3), consistent with the averages computed across all body sizes of clingfish. The surface area of the individual biomimetic structure was designed to be equal to the average area of an individual papilla (Size V), scaled by a factor of 10 (total surface area, 0.21 mm$^2$). The biomimetic surface pattern was compared to a pattern of regular hexagons (RH) and a pattern of squares (S), both with the same surface area. The orientation of the elongated hexagon was varied such that the hexagon was either oriented along (EH) or orthogonal to (EH90) the axis of elongation (FIG. 8, panel c). The control were devoid of surface structures. The surface patterns were formed of silicone and were pulled in shear along an acrylic surface lubricated with glycerol (viscosity, 1.4 Pa·s), which was used as an approximation of the secretions.

The averaged biomimetic papillae (EH) experienced the greatest shear stress in comparison to all other geometries. The biomimetic texture resulted in a shear stress that was roughly twice that of either the regular hexagon or square textures, and 80 times that of the control. All surface textures outperformed the control, demonstrating the need for surface structuring to maintain attachment while subjected to shear forces. Additionally, the orientation of the elongated hexagon when compared to the direction of motion only marginally impacted the shear stress of the surface structure (2.07±0.03 kPa to 1.92±0.01 kPa, for EH90 and EH, respectively). The results suggested that there was no orientation preference of the biomimetic structure.

Based on these results, the surface textures used for the engineered prototypes were selected to be elongated hexagons (aspect ratio, ~1.3) and formed from an elastomer (i.e., silicone). The shape and spacing of textures produce in an increased occurrence of fluid channeling through a dense network of microchannels, and greater conformation to surface asperities. Fluid channeling could reduce the overall distance of separation between the frictional texture and a surface, thus enhancing the effect of wet friction. The presence of channels may also provide a form of geometric compliance along the texture, such that it can better adapt to rough surfaces.

The geometries of the surface structures are tailored to the application. For suction discs used in a viscous and wet environment that may be subjected to randomized stimuli of non-uniform directions. A geometry composed of elongated hexagons can be used. The surface textures also leverage hydrodynamic adhesion to provide axial reinforcement of the texture to the surface. Overall, these function to help maintain the seal of the disc margin and overall grip during shear disturbances. These are not required for attachment of the suction disc as a whole, but are important in various applications, such as surgical manipulations of soft, wet tissue for example. The geometries of the surface structures can also be varied based on the dominant forces that the disc would encounter. Different combinations of size, number, height, shape, spacing, and positioning of the textures provide many options to design the optimal hybrid suction device tailored to a specific application per environment type. However, considering that the potential for dislodgement is greatest during disruptive, high-frequency disturbances, a combination of suction and wet friction would employ multiple attachment processes to secure the device to variable surfaces given unknown disruptive loads.

In some embodiments, active suction via vacuum source can be applied to the suction chamber of the disc to facilitate controllable attachment/detachment of the suction disc. While active suction can improve the performance and usability, it should be noted that it is not essential for attachment/detachment. In other embodiments, pneumatic actuators may be incorporated into the pads extending from the center portion of the assembly to allow flexing of the pads, like fingers, for gripping, and to stabilize the frictional textures to a surface. Pneumatic actuators such as those used for soft robotic applications are well known in the art. While pneumatic actuators are not essential for successful axial attachment, they can be helpful in engaging the surface textures and countering shear disturbances.

Figure 9:
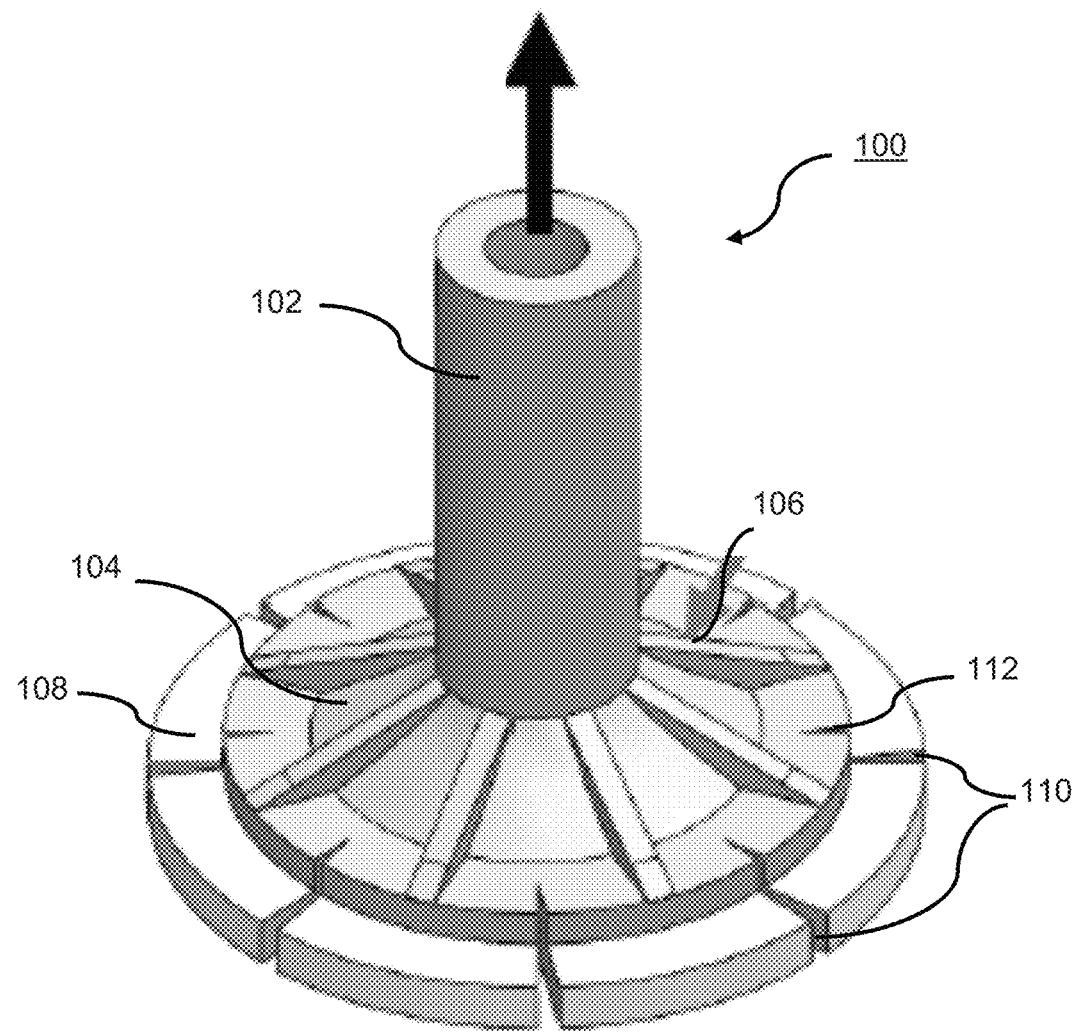
FIG. 9 is a diagram of an embodiment of the inventive suction disc for use with active suction.

FIG. 9 illustrates an embodiment of the inventive suction disc 100 that employs active suction applied through central tube 102 to the interior of suction chamber 104 to control adhesion. Suction chamber 104 is formed from a stiff elastomer. Radial struts 106 are formed (molded) on the outer surface of the suction chamber for reinforcement. Disc margin 108 is formed from a soft elastomer as described previously. Radial slits 110 are distributed around the disc margin 108 to enhance conformability. Small corresponding slits 112 may be formed around the periphery of the suction chamber 104.

Figure 10A:
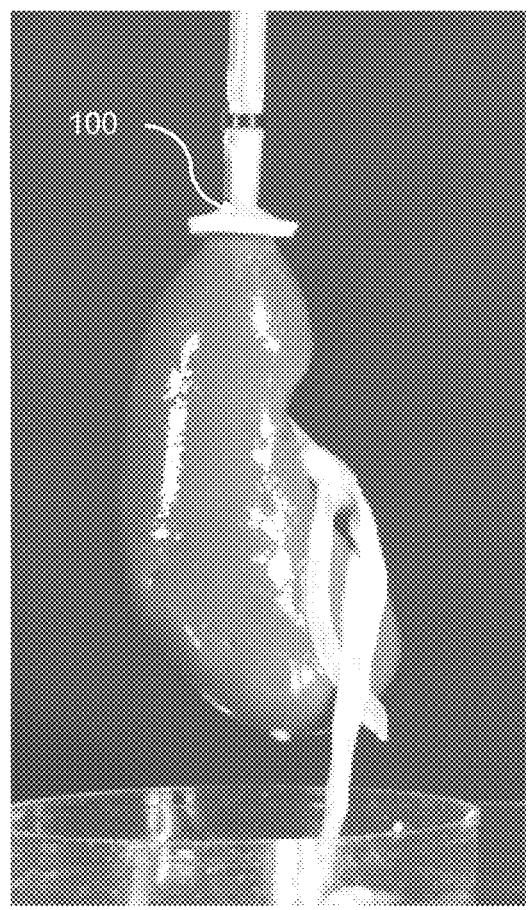
FIGS. 10A and 10B are photographs of an embodiment of the suction disc in potential surgical applications, shown gripping ex vivo kidney tissue and an ex vivo bovine liver, respectively.
Figure 10B:
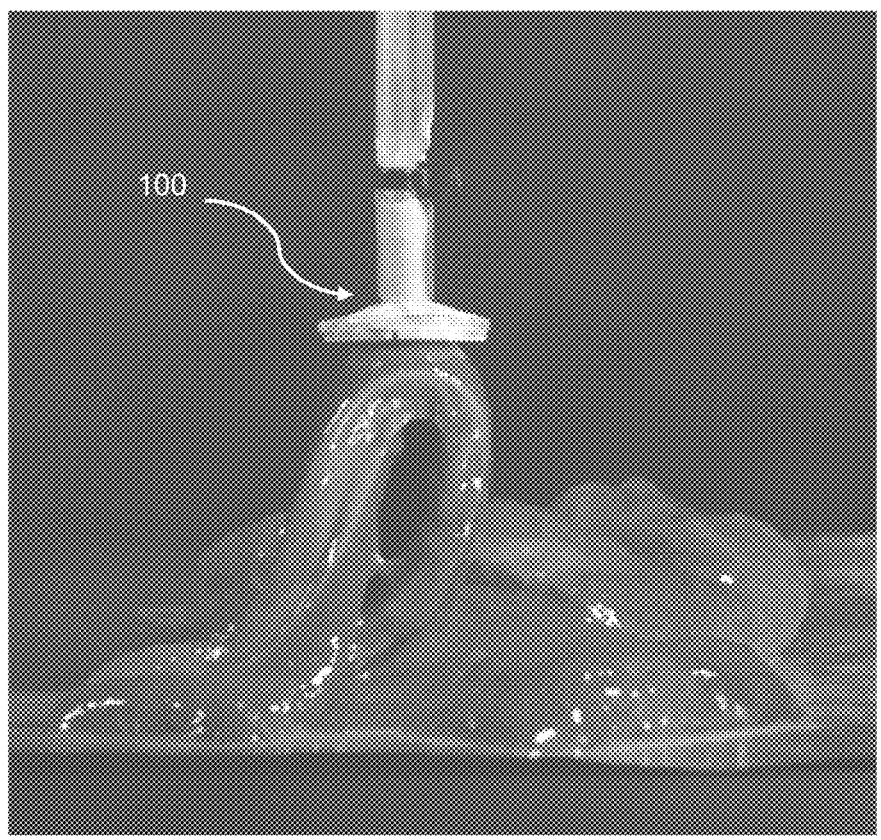

FIGS. 10A and 10B are photographs of demonstrations of use of the embodiment of FIG. 9 in a potential surgical application, with active suction and without surface textures. FIG. 10A shows the suction disc 100 gripping ex vivo kidney tissue. FIG. 10B shows suction disc 100 picking up the liver from ex vivo bovine tissue.

Figure 11A:
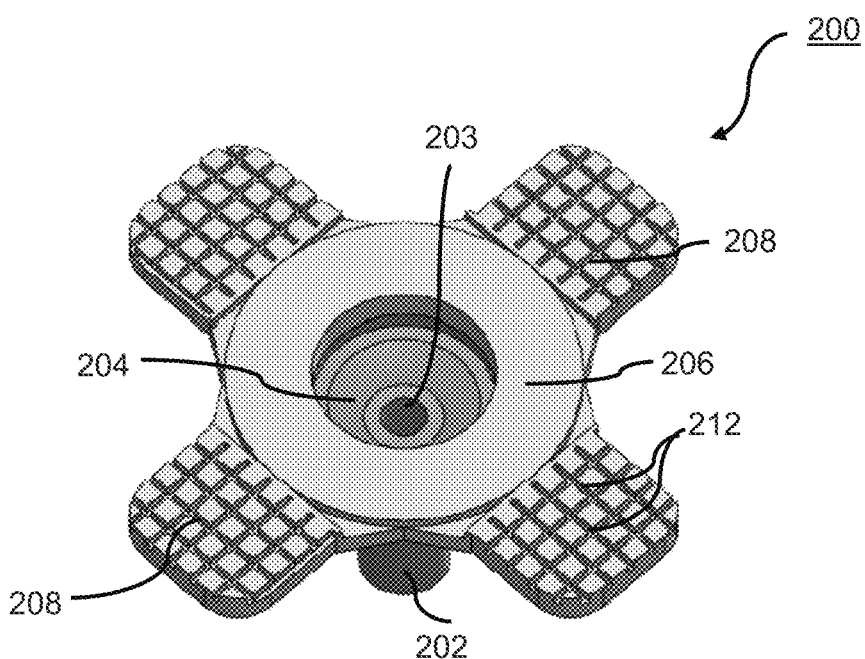
FIG. 11A diagrammatically illustrates another embodiment of the inventive suction disc that is stabilized by surface textures.
Figure 11B:
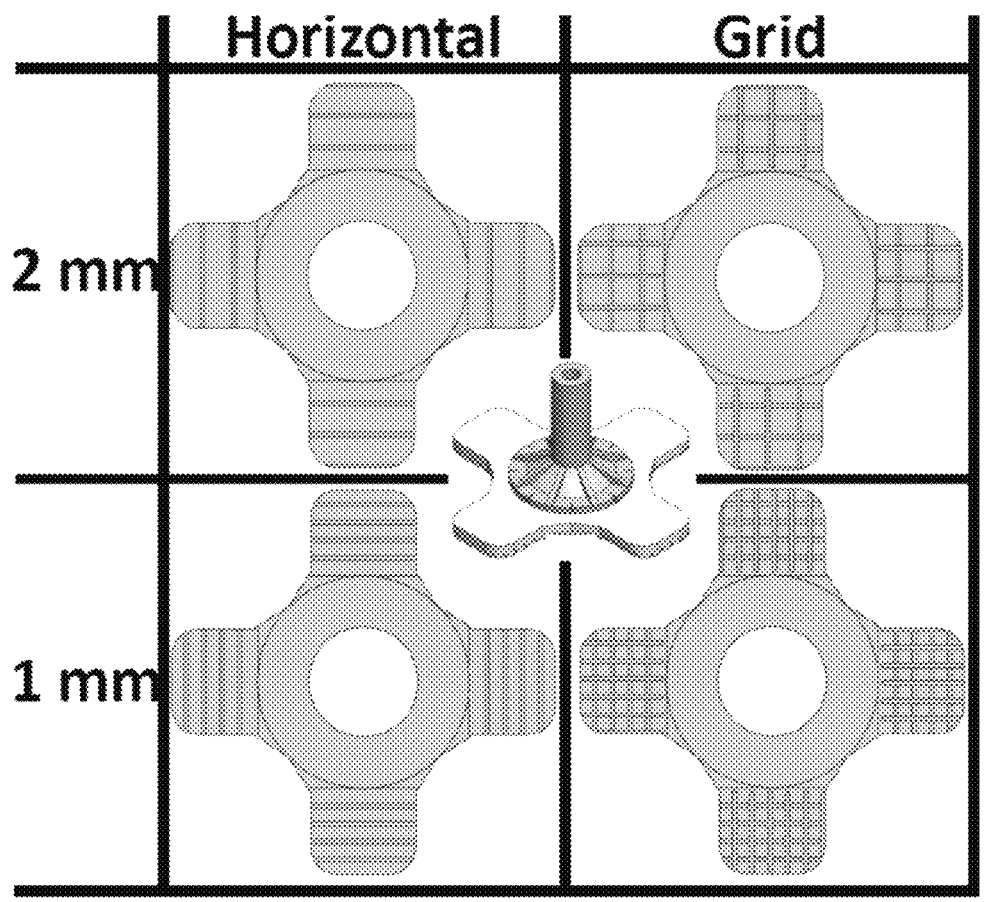
FIG. 11B is a schematic showing different channel geometries within the textured surfaces.

FIG. 11A diagrammatically illustrates another embodiment of the inventive suction disc that is stabilized by surface textures. As shown, suction disc 200 includes four pads 208 with surface textures extending radially from soft elastomer disc 206. As will be readily apparent, fewer or more pads may be used, depending on the application. The pads should generally be uniformly distributed around the central axis, e.g., two pads at 180° spacings, three pads at 120°, four pads at 90°, etc. Suction chamber 204 is configured similar to the disc of FIG. 9, with an opening 203 connecting the interior of chamber 204 to central tube 202 for applying active suction. The textures within pads 208 are created by forming channels 212 in the same soft elastomer as used for disc 206. Channels 212 can be used to define patterns such as a grid of intersecting channels or rows of parallel channels extending horizontally across the pads. Exemplary dimensions for the channels may be on the order of 0.3 mm wide and 0.5 mm deep. The channel dimensions, spacings, and the patterns formed therefrom may vary depending on the application. Selection of appropriate patterns and dimensions will be within the ordinary skill of a person in the art. FIG. 11B illustrates a few examples of different channel geometries for a four pad implementation, in which the resulting feature size, i.e., the surface between the channels, is varied, in these example, between 2 mm (upper panels) vs. 1 mm (lower panels). The left panels illustrate horizontal (parallel) channel patterns, while the right panels show grid patterns. These dimensions and patterns are provided as illustrative examples only. Variations will be readily apparent to those of skill in the art based on the specific uses for which the device is intended.

Figure 12A:
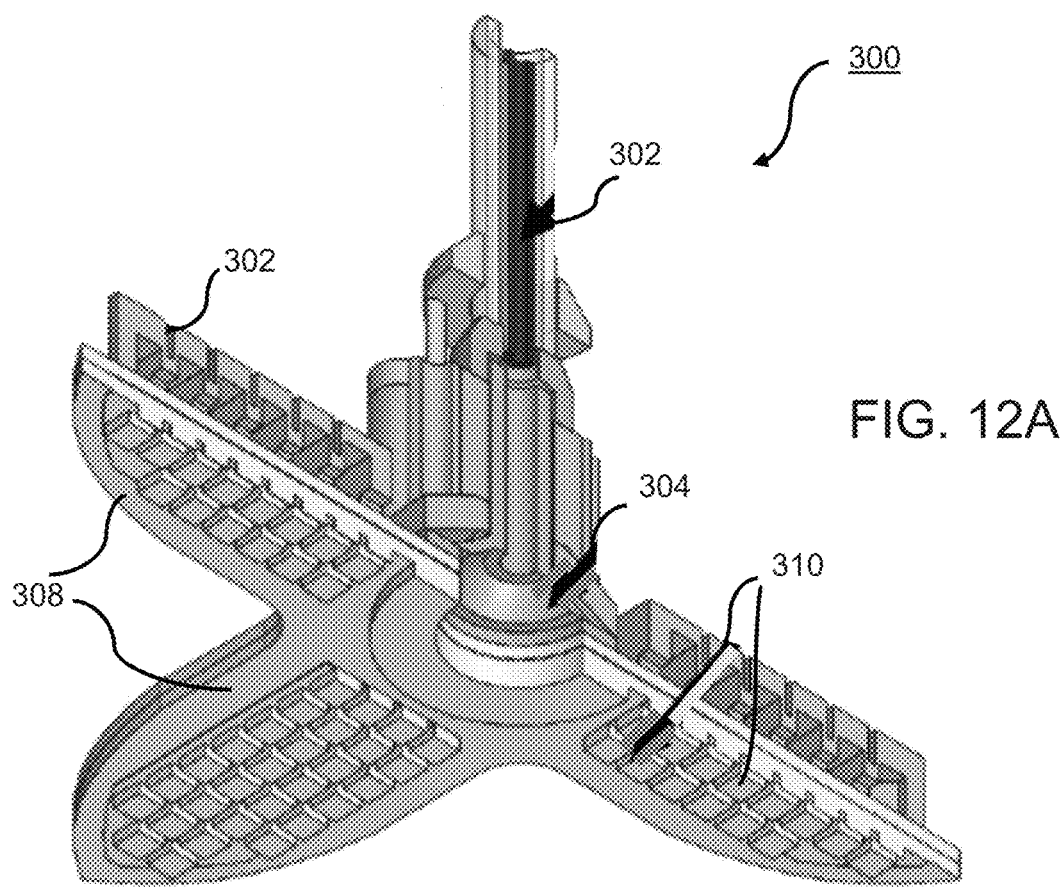
FIG. 12A diagrammatically illustrates another embodiment of the inventive suction disc assembly, partially cut away, with elastomeric textures, active suction and pneumatic actuators.
Figure 12B:
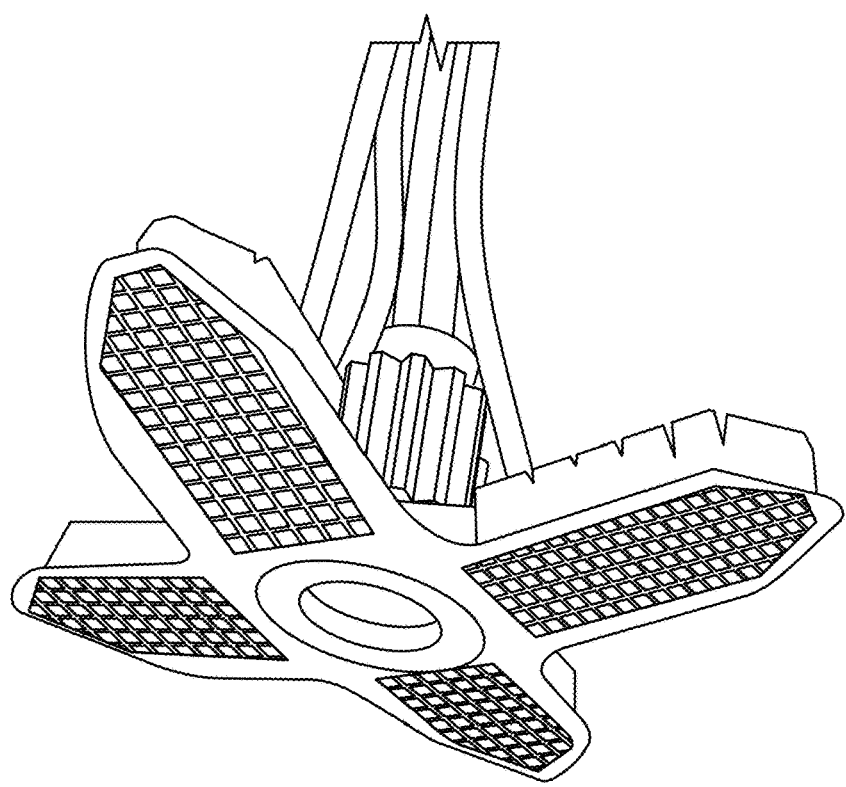
FIG. 12B is a photograph of a prototype of the embodiment.

FIG. 12A illustrates another embodiment of the inventive suction disc 300 in which active suction is combined with shear stability. Suction disc 300 enables axial adhesion to a wet surface by way of the biomimetic surface texture features 310 on pads 308, which provide stability against shear motions, so that suction chamber 304 is supported by the elastomeric texture features 310. While texture features 310 are shown as squares, biomimetic hexagonal and/or pentagonal texture structures as described above are expected to provide better performance based on the clingfish studies. The textures are engaged with a surface using soft pneumatic actuators 302. A suction line 302 is in fluid communication with the suction disc 304 to provide for active control of suction. FIG. 12B is a photograph of a prototype suction disc assembly corresponding to the embodiment of FIG. 12A. The suction lines and pneumatic actuator control lines can be seen in the photograph.

Figure 13A:
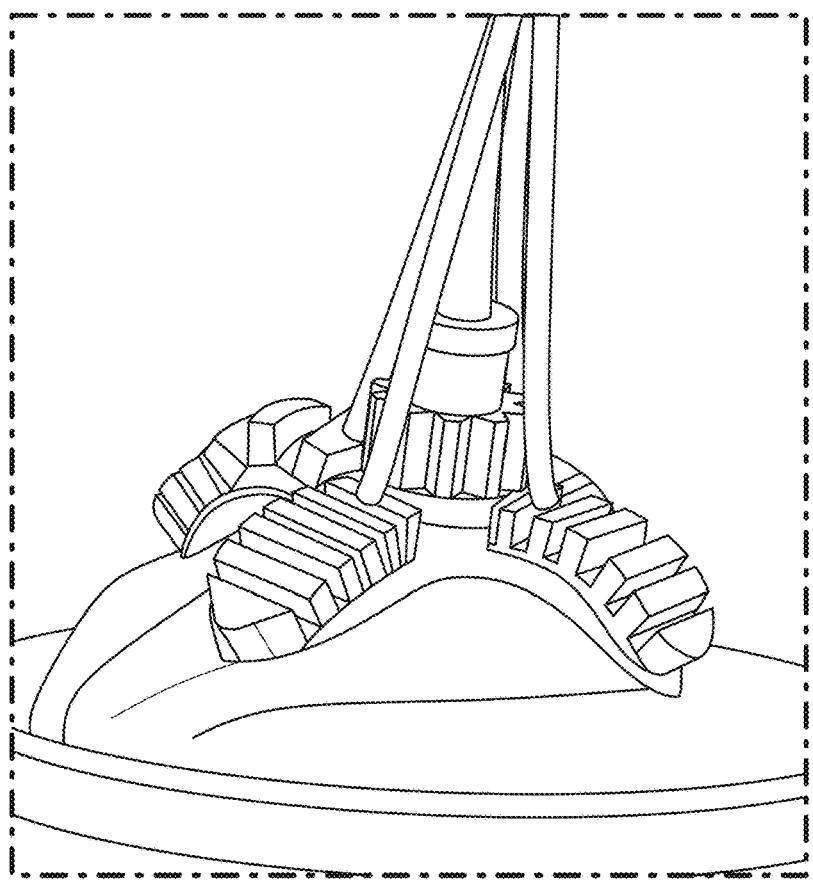
FIGS. 13A and 13B are photographs of a prototype of the embodiment of FIG. 12A with and without active suction and actuation of the pneumatic actuators, respectively.
Figure 13B:
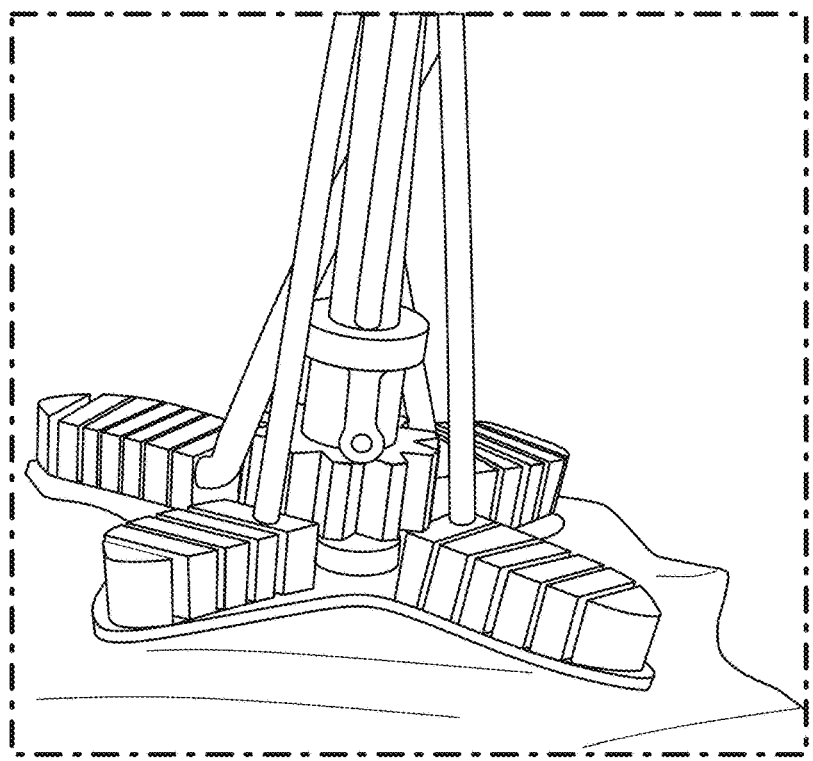

FIGS. 13A and 13B are photographs showing the prototype suction disc assembly of FIG. 12B being used for manipulation of ex vivo liver tissue, in which active suction and actuation of the pneumatic actuators is applied in FIG. 13A. No active suction or pneumatic actuation is used in FIG. 13B. In this application, gripping can still be achieved by the texture structures alone.

Figure 14A:
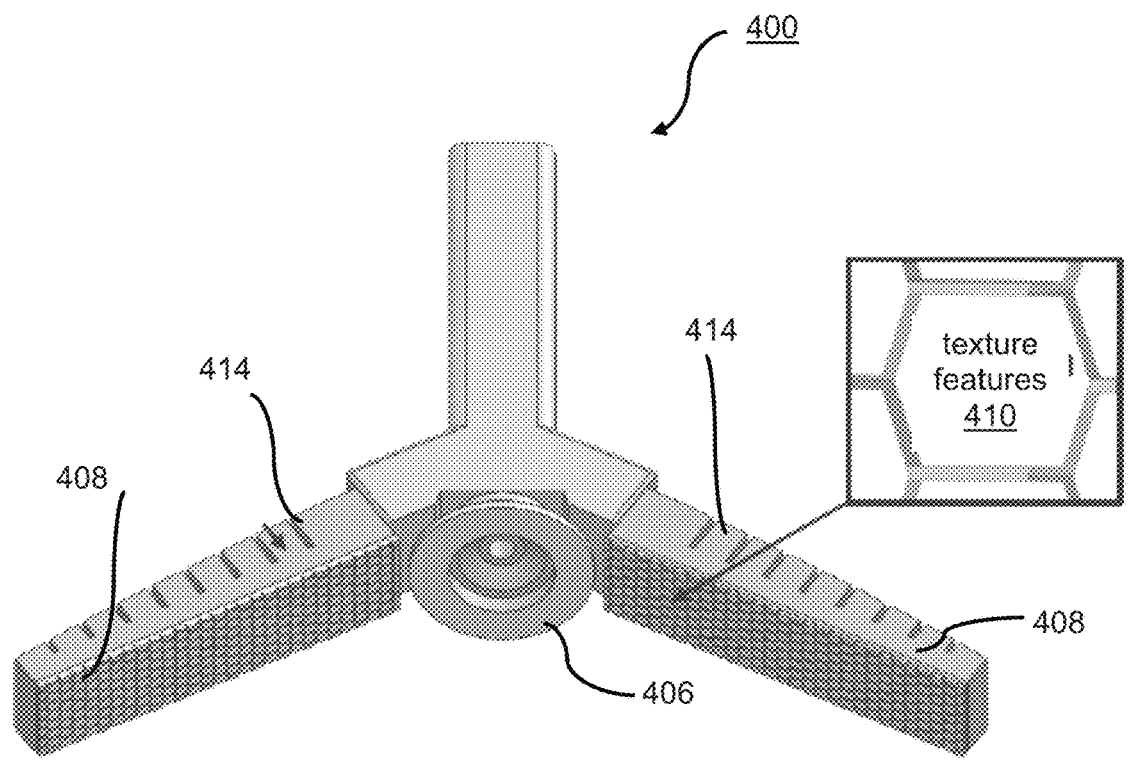
FIG. 14A diagrammatically illustrates still another embodiment of the inventive suction disc assembly with elastomeric textures and pneumatic actuators.
Figure 14B:
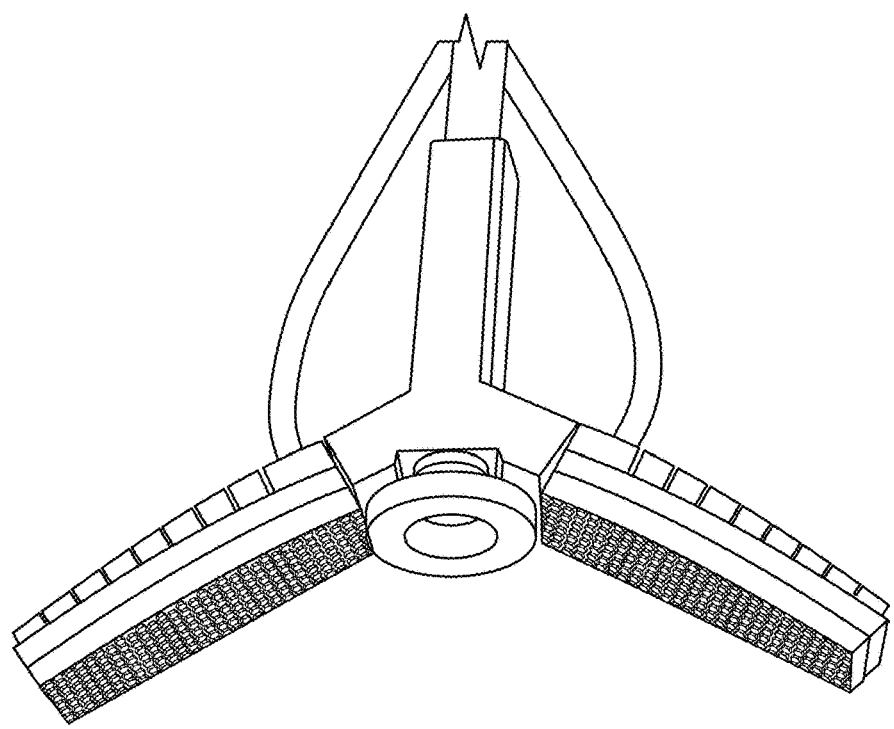
FIG. 14B is a photograph of a prototype of the embodiment.

FIG. 14A illustrates another embodiment of a hybrid gripper 400 using biomimetic friction pads 408 and a suction disc 406. Two pads 408 are illustrated, however, the more pads may be used as needed for different applications. Suction disc 406 is formed from a soft elastomer as previously described. Each pad 408 includes on its gripping surface an array of texture features 410 formed from soft elastomer to generate friction. Pneumatic actuators 414 are attached to pads 408 to allow flexing of the pads for gripping. Pneumatic actuators such as those used for soft robotic applications are well known in the art. FIG. 14B is a photograph showing a prototype assembly of the embodiment of FIG. 14A. The lines for control of the pneumatic actuators can be seen in this image.

The inventive suction disc described herein has numerous commercial applications ranging from, for example, the robotic and medical sectors. Within the field of robotics, one target area is soft gripping and manipulation of delicate substrates. Soft gripping is integral in a variety of fields, from marine archaeology to the manufacturing/agricultural industries. The current state of the art for marine artifact recovery are Kraft or Schilling robotic manipulators, which damage the specimen. Prototypes of the inventive suction discs have already been tested using Remotely Operated Vehicle (ROV) manipulators and provide a promising future application of the technology for marine archaeology. Soft manipulation does not end with underwater archaeology but can be applied to the fruit harvesting and packaging industries. We have demonstrated the ability to reliably pick up even the most delicate of produce, such as strawberries or cherries, without damage.

In the medical field, the inventive suction discs and surface textures can be used for minimally invasive surgeries, in which delicate tissue manipulation is required. As shown in several of the figures, the suction discs have been demonstrated for use in manipulation of different organs. They can be foreseeably extended to many other surgical practices. It is the general opinion of human health experts that further research into such fields as cardiology and internal medicine will yield new uses of the technology. Minimally invasive surgery is the one of the fastest growing areas in health care due to its lower cost. The inventive technology described herein envisions less compressive stress imparted onto tissues during surgical manipulation, which would thus lead to less trauma for the patient.

Outside of the field of robotics, the inventive suction technology can be applied to the domestic sector for wall mounts both in air and in water. The suction disc is not limited to tiled surfaces but can adhere to any grouted or textured surface to which a suction cup currently fails to adhere.

The invention claimed is:

1. A suction device, comprising:
a suction chamber having a radially symmetrical shape centered on a central axis, the suction chamber formed from a first elastomer and having a skirt portion with a skirt diameter; and
a disc margin comprising a flattened ring more flexible than the suction chamber, the flattened ring adhered to a lower surface of the skirt portion, the disc margin formed from a second elastomer and having a disc diameter that extends beyond the skirt diameter, wherein the second elastomer is a compliant material having a lower hardness and lower tensile strength than the first elastomer, the disc margin further comprising a plurality of radially-extending pads, each pad having a plurality of elastomeric texture features formed in a pad contact surface.

2. The suction device of claim 1, wherein the disc margin has a plurality of radial slits formed therein.

3. The suction device of claim 1, wherein the disc margin has the plurality of elastomeric texture features formed in a contact surface thereof, wherein the elastomeric texture features comprise a biomimetic pattern modeled on a geometry and distribution of clingfish papillae having a scaling exponent from 1.3 to 1.5.

4. The suction device of claim 1, wherein the disc margin has the elastomeric texture features formed in a contact surface, wherein the elastomeric texture features comprise structures having one or a combination of hexagonal and pentagonal cross-sections.

5. The suction device of claim 4, wherein the elastomeric texture features comprise elongated hexagonal cross-sections having an average aspect ratio centered around 1.3.

6. The suction device of claim 1, wherein the suction chamber is connected to an active suction source.

7. The suction device of claim 1, wherein the elastomeric texture features are defined by horizontal channels extending across the pads.

8. The suction device of claim 1, wherein the elastomeric texture features are defined by intersecting channels extending across the pads.

9. The suction device of claim 1, wherein the elastomeric texture features comprise a biomimetic pattern modeled on a geometry and distribution of clingfish papillae having a scaling exponent from 1.3 to 1.5.

10. The suction device of claim 1, wherein the elastomeric texture features comprise structures having one or a combination of hexagonal and pentagonal cross-sections.

11. The suction device of claim 10, wherein the elastomeric texture features comprise elongated hexagonal cross-sections having an average aspect ratio centered around 1.3.

12. The suction device of claim 1, wherein each said pad is associated with a pneumatic actuator configured for flexing the pads.

13. The suction device of claim 1, wherein the first elastomer is a first silicone material having a Shore A hardness of approximately 20.

14. A suction device, comprising:
a suction chamber having a radially symmetrical shape centered on a central axis, the suction chamber formed from a first elastomer and having a skirt portion with a skirt diameter;
a disc margin comprising a flattened ring more flexible than the suction chamber, the flattened ring adhered to a lower surface of the skirt portion, the disc margin formed from a second elastomer and having a disc diameter that extends beyond the skirt diameter, wherein the second elastomer is a compliant material having a lower hardness and lower tensile strength than the first elastomer; and
a plurality of radial pads extending from the disc margin, each pad having a plurality of elastomeric texture features formed from the second elastomer on a pad contact surface.

15. The suction device of claim 14, wherein the elastomeric texture features are defined by horizontal channels extending across the pad.

16. The suction device of claim 14, wherein the elastomeric texture features are defined by intersecting channels extending across the pad.

17. The suction device of claim 14, wherein the elastomeric texture features comprise a biomimetic pattern modeled on a geometry and distribution of clingfish papillae having a scaling exponent from 1.3 to 1.5.

18. The suction device of claim 14, wherein the elastomeric texture features comprise structures having one or a combination of hexagonal and pentagonal cross-sections.

19. The suction device of claim 18, wherein the elastomeric texture features comprises elongated hexagonal cross-sections having an average aspect ratio centered around 1.3.

20. The suction device of claim 14, wherein each pad is associated with a pneumatic actuator configured for flexing the pad.

21. The suction device of claim 14, wherein the first elastomer is a first silicone material having a Shore A hardness of approximately 20.

22. The suction device of claim 14, wherein the suction chamber is connected to an active suction source.

* * * * *